United States Patent
Mizutani et al.

(10) Patent No.: US 12,174,778 B2
(45) Date of Patent: Dec. 24, 2024

(54) TRANSMISSION DEVICE AND COMMUNICATION SYSTEM

(71) Applicant: Sony Semiconductor Solutions Corporation, Kanagawa (JP)

(72) Inventors: Yuichi Mizutani, Tokyo (JP); Tadaaki Yuba, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 4 days.

(21) Appl. No.: 17/637,655

(22) PCT Filed: Oct. 1, 2020

(86) PCT No.: PCT/JP2020/037442
§ 371 (c)(1),
(2) Date: Feb. 23, 2022

(87) PCT Pub. No.: WO2021/070734
PCT Pub. Date: Apr. 15, 2021

(65) Prior Publication Data
US 2022/0276980 A1 Sep. 1, 2022

(30) Foreign Application Priority Data
Oct. 11, 2019 (JP) .................................. 2019-188009

(51) Int. Cl.
*G06F 13/42* (2006.01)
*G06F 3/00* (2006.01)
(Continued)

(52) U.S. Cl.
CPC .......... *G06F 13/4282* (2013.01); *G06F 13/20* (2013.01); *G06F 13/4022* (2013.01); *G06F 2213/0016* (2013.01)

(58) Field of Classification Search
CPC .. G06F 13/4282; G06F 13/20; G06F 13/4022; G06F 2213/0016; G06F 3/00; G06F 13/38
(Continued)

(56) References Cited

U.S. PATENT DOCUMENTS 6,519,663 B1 * 2/2003 Osten ................... G06F 13/4295
713/323
8,031,130 B2 * 10/2011 Tamura ................... H04L 25/05
710/104
(Continued)

FOREIGN PATENT DOCUMENTS

| JP | 2007-88773 A | 4/2007 |
|---|---|---|
| JP | 2012-209717 A | 10/2012 |
| WO | 2017/061330 A1 | 4/2017 |

OTHER PUBLICATIONS

International Search Report (PCT/ISA/210), International Application No. PCT/JP2020/037442, dated Dec. 3, 2020.

*Primary Examiner* — Idriss N Alrobaye
*Assistant Examiner* — Henry W Yu
(74) *Attorney, Agent, or Firm* — Michael Best & Friedrich LLP

(57) ABSTRACT

A transmission device communicates with a reception device via a control data bus in a communication standard of I3C. The transmission device includes a transfer mode switching section and a data transmission section. The transfer mode switching section switches a transfer mode of the control data bus from a first transfer mode having a first transfer rate to a second transfer mode having a second transfer rate faster than the first transfer rate by transmitting a switching command instructing to switch to the second transfer mode after issuance of an IBI request using a function of the I3C in the first transfer mode. The data (Continued)

transmission section transmits data to the reception device via the control data bus in the second transfer mode.

20 Claims, 13 Drawing Sheets

(51) Int. Cl.
*G06F 13/20* (2006.01)
*G06F 13/38* (2006.01)
*G06F 13/40* (2006.01)

(58) Field of Classification Search
USPC .............. 710/5, 14, 16, 20, 33, 62, 105, 305
See application file for complete search history.

(56) References Cited

U.S. PATENT DOCUMENTS

| | | | |
|---|---|---|---|
| 10,274,758 B1* | 4/2019 | Liu .......................... | G02F 1/025 |
| 2011/0044217 A1* | 2/2011 | Wu .......................... | H04L 5/14 |
| | | | 370/294 |
| 2016/0147684 A1* | 5/2016 | Sengoku ............. | G06F 13/4282 |
| | | | 710/105 |
| 2016/0364353 A1* | 12/2016 | Sengoku ............. | G06F 13/4282 |
| 2017/0104733 A1* | 4/2017 | Thanigasalam ..... | G06F 13/1673 |
| 2017/0201287 A1* | 7/2017 | Nail ........................ | H04B 1/44 |
| 2018/0062887 A1* | 3/2018 | Sengoku ................ | H04L 25/14 |
| 2018/0357199 A1* | 12/2018 | Mishra ................ | G06F 13/4004 |
| 2019/0049513 A1* | 2/2019 | Azam ................ | G01R 31/3177 |
| 2020/0019734 A1* | 1/2020 | Raja Gopal ........... | H04L 9/0631 |
| 2020/0073839 A1* | 3/2020 | Maung ................. | G06F 13/382 |

* cited by examiner

[FIG. 1]
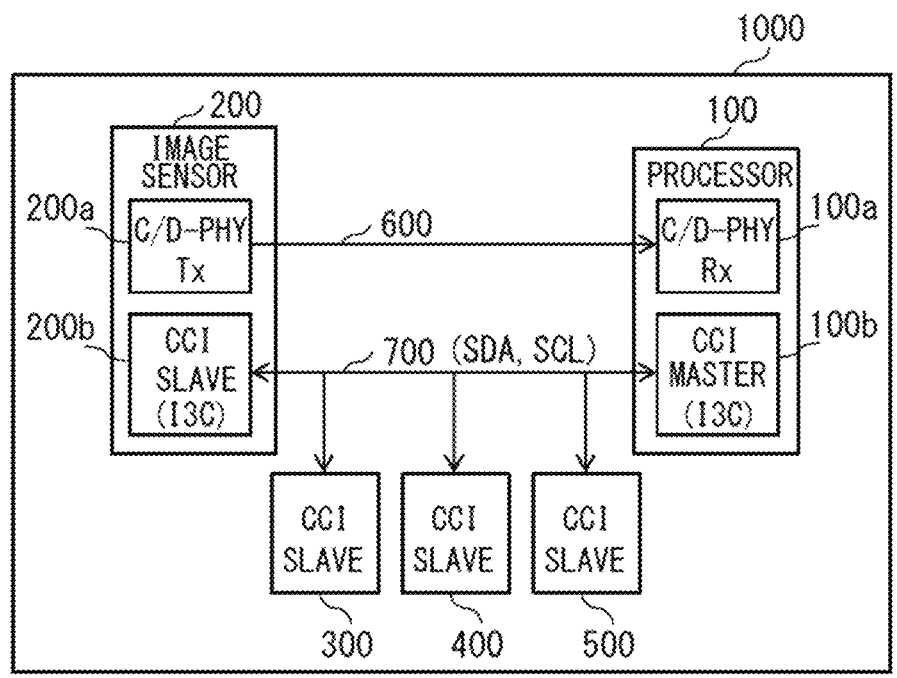

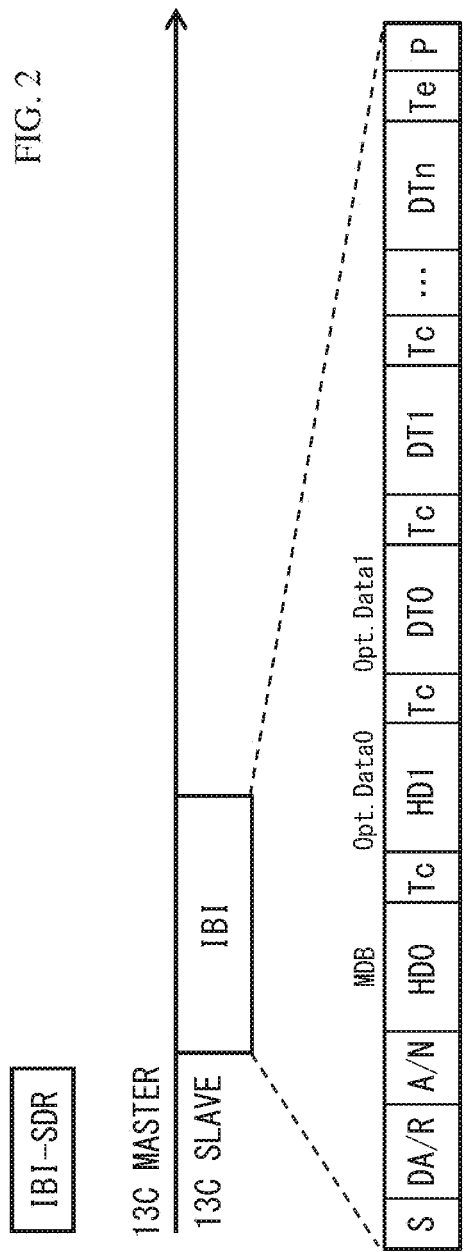

[ FIG. 3 ]

| byte | bit | Difinision |
|---|---|---|
| HD0 | [7] | Reserved by I3C standard specification |
| | [6:2] | Reserved |
| | [1:0] | Type of transfer data<br>2'b00 : Reserved<br>2'b01 : MD/ALS<br>2'b10 : FD<br>2'b11 : Reserved |
| HD1 | [7:0] | Number for transfer data bytes |
| | | MD/ALS: 8'h00 : Reserved / 8'h01 : 1x1 / 8'h02 : 16x5 / 8'h03 : 16x10 / 8'h04 : 32x10 / Else : Reserved |
| | | FD: 8'h00 : Reserved / 8'h01 : Face Number(=1) ~ 8'h10: Face Number(=16) / Else : Reserved |

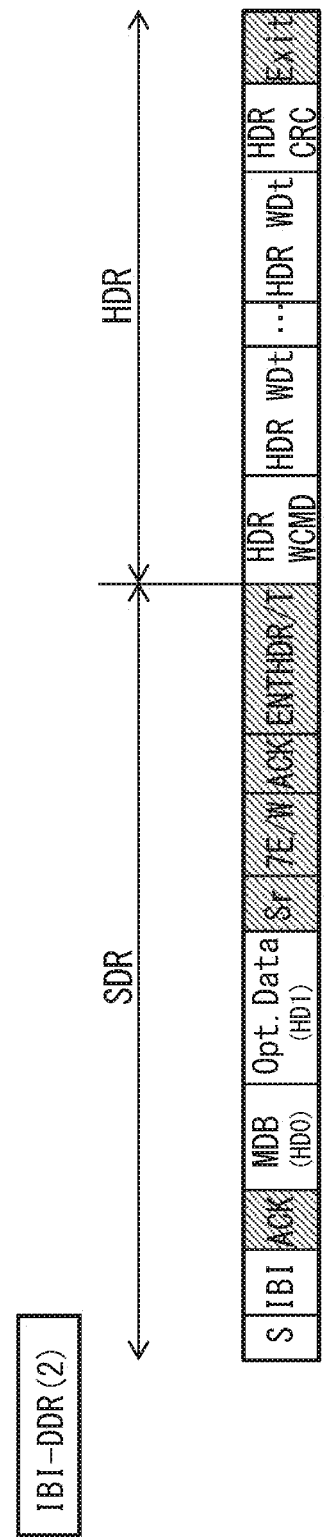

[ FIG. 6 ]

| Interrupt Group Identifier Field | | | Specific Interrupt Identifier Field | | | | |
|---|---|---|---|---|---|---|---|
| MDB[7] | MDB[6] | MDB[5] | MDB[4] | MDB[3] | MDB[2] | MDB[1] | MDB[0] |

[ FIG. 7 ]

| | MDB Category | Interrupt Group Identifier MDB[7:5] | Specific Interrupt Identifier Value MDB[4:0] | | Description |
|---|---|---|---|---|---|
| A | User Defined | 3'b000 | 5'h00 – 5'h1F | Vendor Reserved | Defined by the vendor and reserved for vendor definition |
| | Sensor WG | 3'b001 | 5'h00 – 5'h0C | MIPI Alliance Sensor WG Reserved | Defined and interpreted based on some reserved values allocated by MIPI Alliance Sensor WG |
| | | | 5'h0D | Error with additional data bytes in IBI payload | Indicates that the interrupt is related to a specific functionality, e.g., D2DT. |
| | | | 5'h0E | Generic error, no additional data bytes in IBI payload | |
| | | | 5'h0F – 5'h11 | MIPI Alliance Sensor WG Reserved | |
| | | | 5'h12 | Monitoring Devices Interrupt Enabling | |
| | | | 5'h13 – 5'h16 | MIPI Alliance Sensor WG Reserved | |
| | | | 5'h17 | D2DT Identifier | |
| | | | 5'h18 – 5'h1F | MIPI Alliance Sensor WG Reserved | |
| B | MIPI Groups | 3'b010 | 5'h00 – 5'h1B | MIPI Alliance Reserved | Allocated and reserved by MIPI Alliance Working Groups, and approved by MIPI Alliance Sensor WG. |
| | | | 5'h1C – 5'h1D | MIPI Alliance Debug WG Reserved | Indicates that the interrupt is generated by a Device that wants to send a specific MIPI Alliance WG-related interrupt (e.g., Debug) |
| | | | 5'h1E – 5'h1F | MIPI Alliance Reserved | |
| | Non MIPI Reserved | 3'b011 | 5'h00 – 5'h1F | Non MIPI Reserved | Allocated for uses outside of MIPI Alliance |
| | Timing Information | 3'b100 | 5'h00 – 5'h1F | Vendor Reserved | May have any value defined by the vendor |
| | Pending Read Notification | 3'b101 | 5'h00 – 5'h0C | MIPI Alliance Sensor WG Reserved | Indicates that the interrupt is generated by a Device that wants to send a specific MIPI Alliance WG-related or vendor-specific interrupt, and has a data message which will be returned on the next Private Read if ACKed (see Section 5.1.6.2.2) |
| | | | 5'h0D | MIPI Alliance Debug WG Reserved | |
| | | | 5'h0E – 5'h0F | MIPI Alliance Sensor WG Reserved | |
| | | | 5'h10 – 5'h1F | Vendor Reserved | |
| C | Reserved | 3'b110 | — | | Reserved |
| D | Reserved | 3'b111 | — | | Reserved |

[ FIG. 8 ]

| MDB Category | Interrupt Group Identifier | Specific Interrupt Identifier Value | | Description |
|---|---|---|---|---|
| | MDB[7:5] | MDB[4:0] | | |
| | | MDB[4] | MDB[3:0] | |
| User Defined | 3'b000 | 1'b0 | 4'h0-4'hF | Vender Reserved (for RAW Data Transfer) |
| | | 1'b1 | 4'h0-4'hF | Vender Reserved (for mipi Data Transfer) |

[ FIG. 9 ]

| MDB Category | Interrupt Group Identifier | Specific Interrupt Identifier Value | | Description |
|---|---|---|---|---|
| | MDB[7:5] | MDB[4:0] | | |
| | | MDB[4] | MDB[3:0] | |
| MIPI Groups | 3'b010 or 3'b110 or 3'b111 | 1'b0 | 4'h0-4'hF | Vender Reserved (for RAW Data Transfer) |
| | | 1'b1 | 4'h0-4'hF | Vender Reserved (for mipi Data Transfer) |

[ FIG. 10 ]
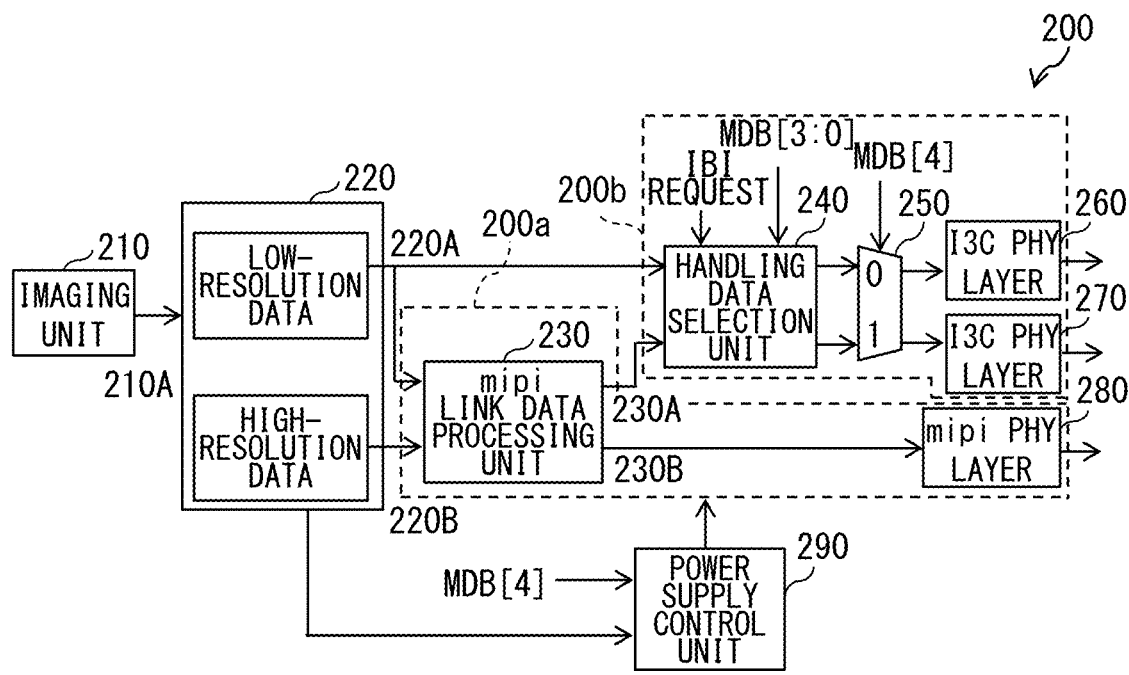

[ FIG. 11 ]
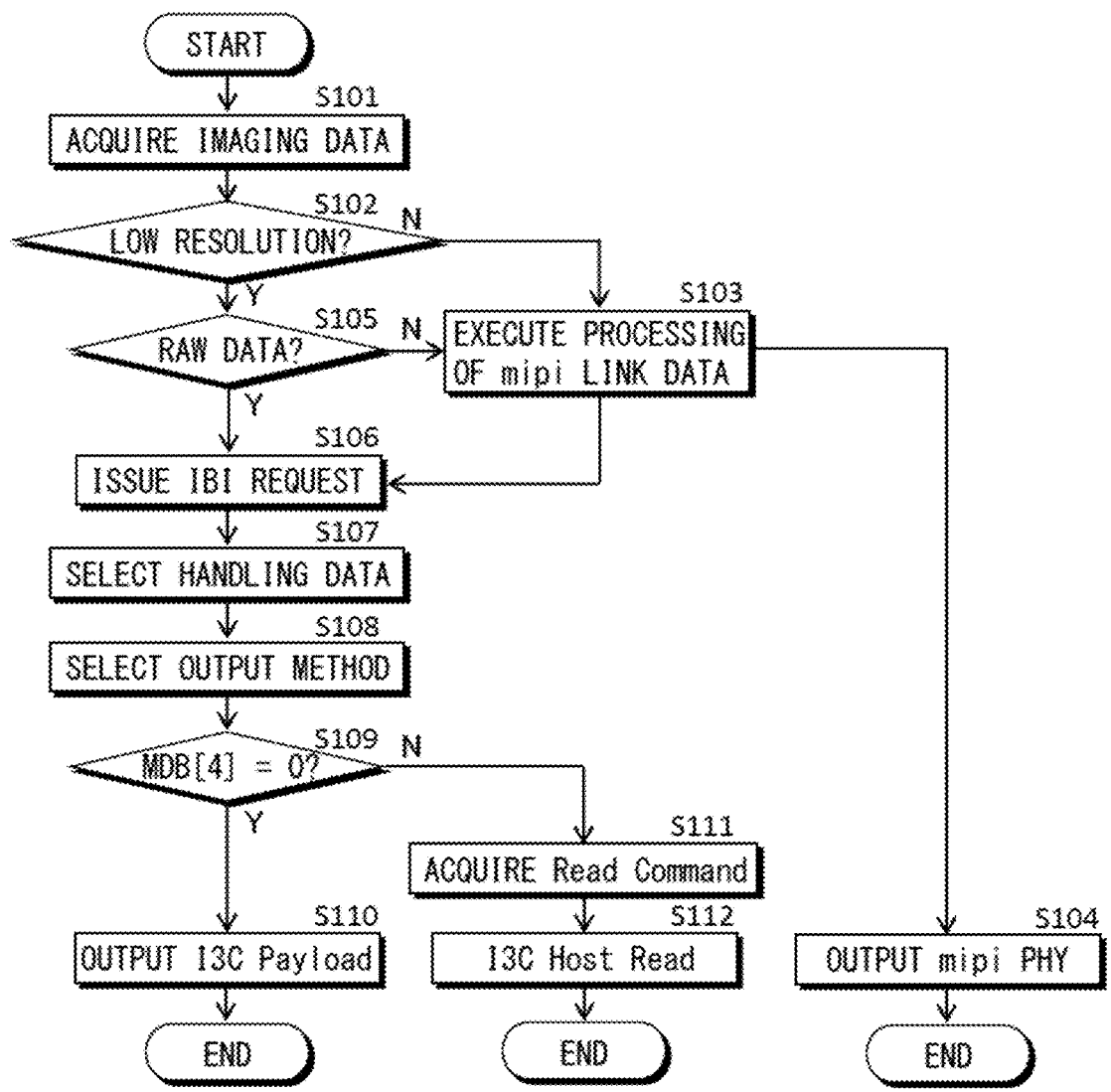

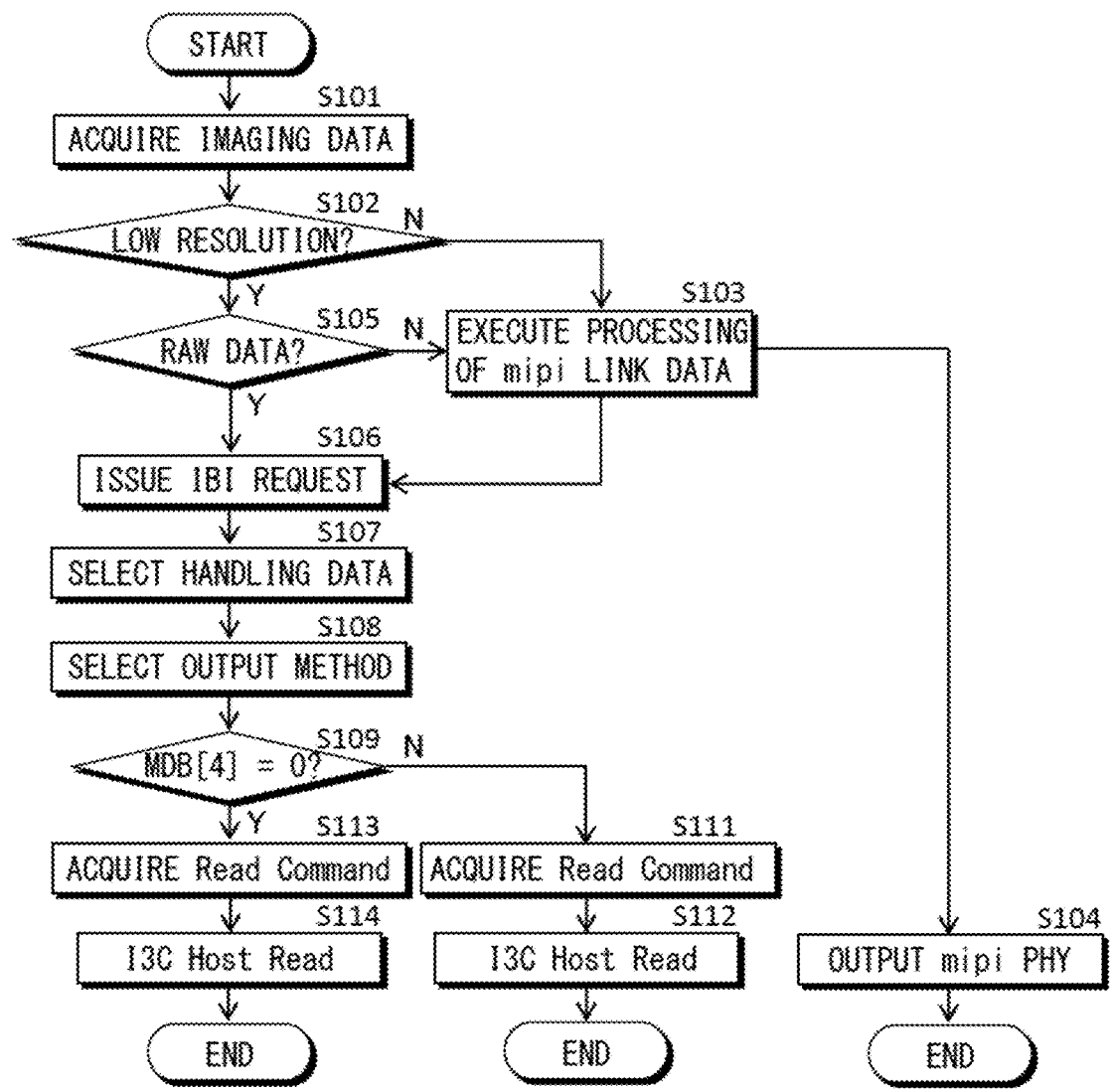
[ FIG. 12 ]

[ FIG. 13 ]
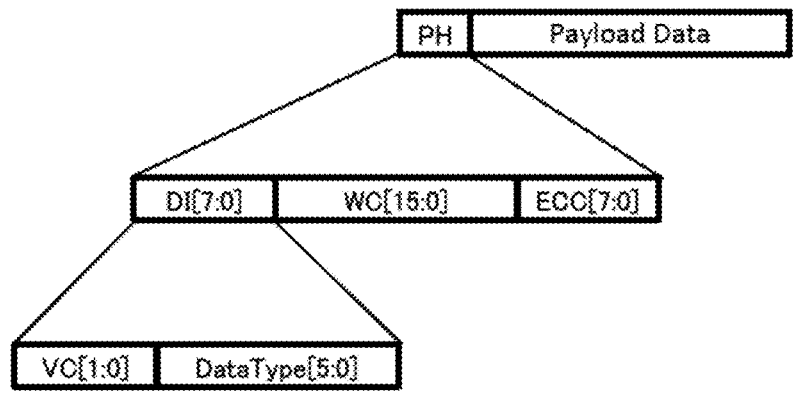
[ FIG. 14 ]
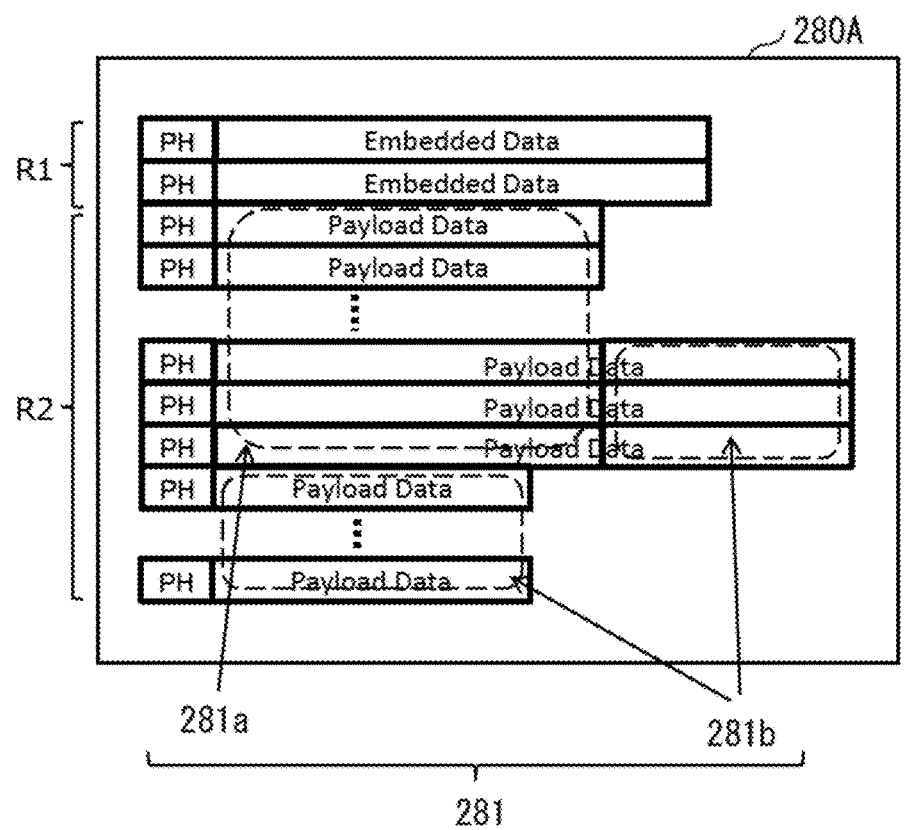

[ FIG. 15 ]
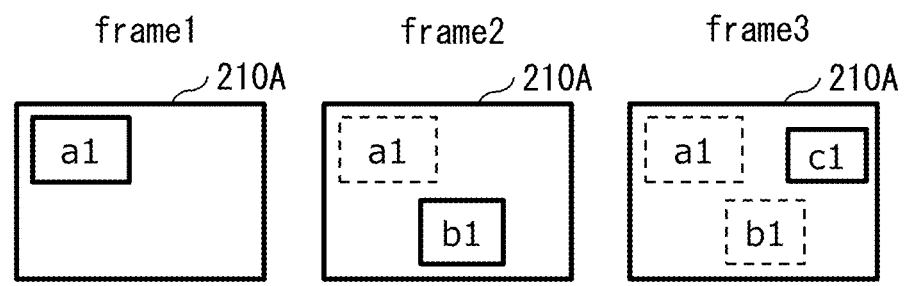
[ FIG. 16 ]
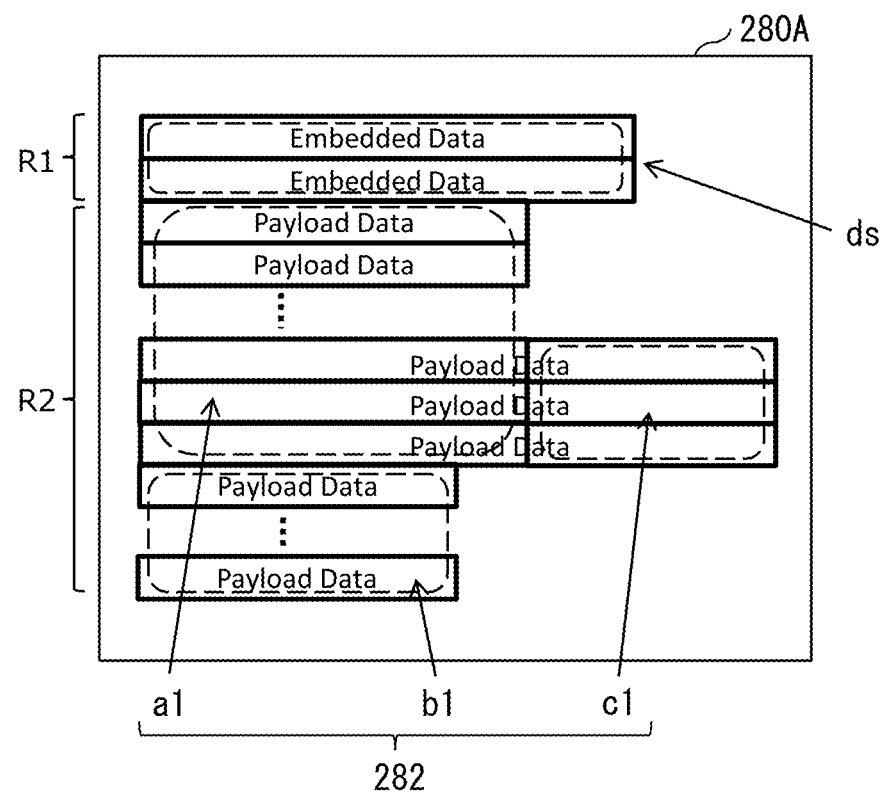

TRANSMISSION DEVICE AND COMMUNICATION SYSTEM

TECHNICAL FIELD

The present disclosure relates to a transmission device and a communication system.

BACKGROUND ART

As an existing bus IF (Interface) to be used for communication in a board mounted with multiple devices, for example, I²C (Inter-Integrated Circuit) has been often used. In addition, recently, a higher-speed I²C has been required, and the specification of I3C (Improved Inter Integrated Circuit) has progressed as a next-generation standard. For example, a communication system using the I3C is disclosed, for example, in PTL 1.

CITATION LIST

Patent Literature

PTL 1: International Publication No. WO2017/061330

SUMMARY OF THE INVENTION

Incidentally, a communication system using I3CI3C is required to have higher speed as well as lower power consumption in data transmission. It is therefore desirable to provide a transmission device and a communication system that make it possible to achieve higher speed as well as lower power consumption in data transmission.

A transmission device according to a first aspect of the present disclosure communicates with a reception device via a control data bus in a communication standard of I3C (Improved Inter Integrated Circuit). The transmission device according to the first aspect of the present disclosure includes a transfer mode switching section and a data transmission section. The transfer mode switching section switches a transfer mode of the control data bus from a first transfer mode having a first transfer rate to a second transfer mode having a second transfer rate faster than the first transfer rate by transmitting a switching command instructing to switch to the second transfer mode after issuance of an IBI (In-Band Interrupt) request using a function of the I3C in the first transfer mode. The data transmission section transmits data to the reception device via the control data bus in the second transfer mode.

A communication system according to the first aspect of the present disclosure includes a control data bus, and a transmission device and a reception device that communicate via the control data bus in a communication standard of I3C (Improved Inter Integrated Circuit). The transmission device includes a transfer mode switching section and a data transmission section. The transfer mode switching section switches a transfer mode of the control data bus from a first transfer mode having a first transfer rate to a second transfer mode having a second transfer rate faster than the first transfer rate by transmitting a switching command instructing to switch to the second transfer mode after issuance of an IBI (In-Band Interrupt) request using a function of the I3C in the first transfer mode. The data transmission section transmits data to the reception device via the control data bus in the second transfer mode.

In the transmission device according to the first aspect of the present disclosure and the communication system according to the first aspect of the present disclosure, the transfer mode of the control data bus is switched from the first transfer mode to the second transfer mode by transmitting the switching command in the transfer mode after the issuance of the IBI request using the function of the I3C. This eliminates the need to provide a dedicated terminal for the IBI request, and eliminates the need to receive the switching command from the reception device.

A transmission device according to a second aspect of the present disclosure communicates with a reception device via a control data bus in a communication standard of I3C (Improved Inter Integrated Circuit). The transmission device according to the second aspect of the present disclosure includes a transfer mode switching section and a data transmission section. The transfer mode switching section switches a transfer mode of the control data bus from a first transfer mode having a first transfer rate to a second transfer mode having a second transfer rate faster than the first transfer rate by receiving from the reception device a switching command instructing to switch to the second transfer mode after issuance of an IBI (In-Band Interrupt) request using a function of the I3C in the first transfer mode. The data transmission section transmits data to the reception device via the control data bus in the second transfer mode.

A communication system according to the second aspect of the present disclosure includes a control data bus, and a transmission device and a reception device that communicate via the control data bus in a communication standard of I3C (Improved Inter Integrated Circuit). The transmission device includes a transfer mode switching section and a data transmission section. The transfer mode switching section switches a transfer mode of the control data bus from a first transfer mode having a first transfer rate to a second transfer mode having a second transfer rate faster than the first transfer rate by receiving from the reception device a switching command instructing to switch to the second transfer mode after issuance of an IBI (In-Band Interrupt) request using a function of the I3C in the first transfer mode. The data transmission section transmits data to the reception device via the control data bus in the second transfer mode.

In the transmission device according to the second aspect of the present disclosure and the communication system according to the second aspect of the present disclosure, the transfer mode of the control data bus is switched from the first transfer mode to the second transfer mode by receiving from the reception device the switching command in the transfer mode after the issuance of the IBI request using the function of the I3C. This eliminates the need to provide a dedicated terminal for the IBI request.

BRIEF DESCRIPTION OF THE DRAWINGS

FIG. 1 illustrates a schematic configuration example of a communication system.

FIG. 2 illustrates an example of a data format of IBI issued from a slave in an SDR mode.

FIG. 3 illustrates an example of definition of header data in data transmission by IBI-SDR.

FIG. 5 illustrates an example of an example of a data format upon data transmission to a master in HDR-DDR Read subsequent to the IBI in the SDR mode.

FIG. 6 illustrates an example of a data format of MDB.

FIG. 7 illustrates an example of Value Ranges of the MDB.

FIG. 8 illustrates an example of Value Ranges of the MDB.

FIG. 9 illustrates an example of Value Ranges of the MDB.

FIG. 10 illustrates a schematic configuration example of an image sensor.

FIG. 11 illustrates an example of a data transmission procedure in a communication system.

FIG. 12 illustrates another example of the data transmission procedure in the communication system.

FIG. 13 illustrates a configuration example of a packet to be utilized in MIPI.

FIG. 14 illustrates a configuration example of transmission data to be used in the MIPI.

FIG. 15 illustrates examples of image data obtained by an imaging unit.

FIG. 16 illustrates an example of encoding of the image data in FIG. 15.

MODES FOR CARRYING OUT THE INVENTION

Figure 4:
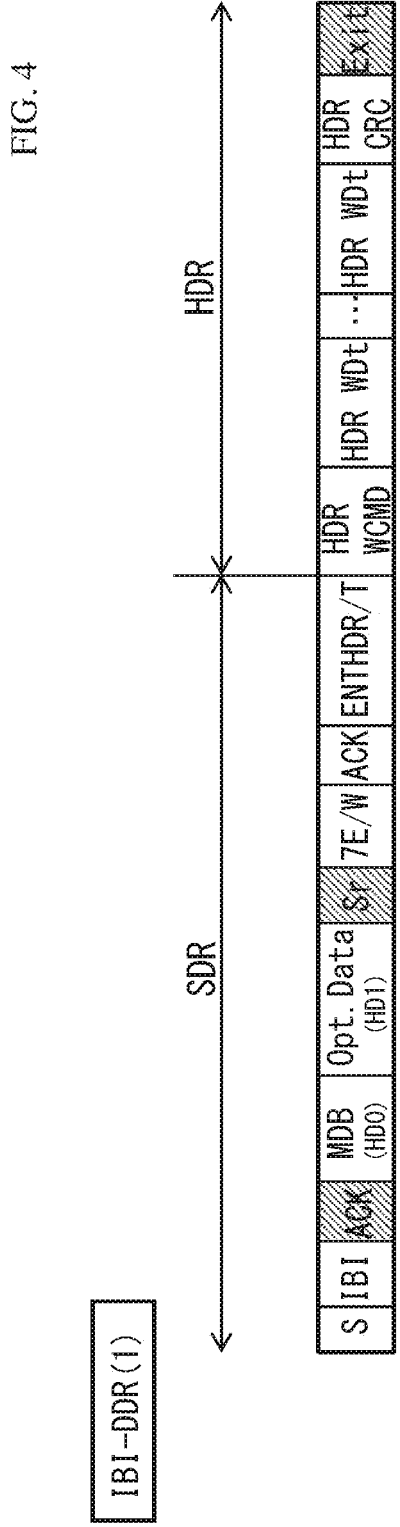
FIG. 4 illustrates an example of an example of a data format upon data transmission to a master in HDR-DDR Write subsequent to the IBI in the SDR mode.

Hereinafter, description is given in detail of modes for carrying out the present disclosure with reference to the drawings. The following description is given of specific examples of the present disclosure, and the present disclosure is not limited to the following embodiment.

FIG. 1 illustrates a schematic configuration example of a communication system 1000 according to an embodiment of the present disclosure. The communication system 1000 is applicable to a system equipped with a camera device. For example, the communication system 1000 is applicable to a monitoring camera (e.g., a home security system), an industrial apparatus (e.g., an apparatus with a failure detection function using a camera), a robotic apparatus (e.g., a drone equipped with a camera), a mobile apparatus (e.g., a smartphone equipped with a camera), or the like. The communication system 1000 includes an image data bus 600 and a control data bus 700. The image data bus 600 and the control data bus 700 may be mounted between or inside devices in the communication system 1000. The communication system 1000 is, for example, a camera device. The image data bus 600 and the control data bus 700 are mounted inside the camera device and coupled to an image sensor 200 and a processor 100. The control data bus 700 may be further coupled to multiple slaves 300, 400, and 500.

In FIG. 1, image data may be transmitted from a transmitter 200*a* of the image sensor 200 to a receiver 100*a* of the processor 100 via the image data bus 600 of C-PHY or D-PHY (i.e., high-speed differential link) defined by MIPI. The control data bus 700 may include two wiring lines that are configurable to operate in an I3C communication standard. Accordingly, the control data bus 700 includes a clock line SCL and a data line SDA. The data line SDA may carry image data from a slave 200*b* of the image sensor 200 to a master 100*b* of the processor 100 in accordance with the I3C communication standard. The clock line SCL may carry a clock signal that is used to synchronize data transfers via the control data bus 700 in accordance with the I3C communication standard. The operation mode via the I3C bus may be sometimes referred to as a CCI mode when being used for an application example of a camera.

The control data bus 700 may be configured to couple the master 100*b* and the four slaves 200*b*, 300, 400, and 500 via the two wiring lines (the clock line SCL and the data line SDA). In the control data bus 700, multiple transmission methods are defined which are different from each other in communication speeds, and the master 100*b* and the slave 200*b* are able to switch the transmission methods. For example, in the control data bus 700, multiple transfer modes are defined which have data transfer rates different from each other. Examples of such multiple transfer modes which are defined include an SDR (Standard Data Rate) mode in which data is transmitted at a normal transfer rate and an HDR (High Data Rate) mode in which data is transmitted at a transfer rate higher than the SDR. In addition, in the HDR mode, there are defined by a standard: three transfer modes of a DDR (Double Data Rate) mode, a TSP (Ternary Symbol Pure-Bus) mode, and a TSL (Ternary Symbol Legacy-inclusive-Bus) mode. In addition, in the I3C, a common command code (CCC: Common Command Code) is utilized to be able to transmit a command to one or multiple ones all at or to set an address assigned dynamically (DAA: Dynamic Address Assignment). The SDR mode corresponds to a specific example of a "first transfer mode" of the present disclosure. The HDR mode, the DDR mode, the TSP mode, and the TSL mode each correspond to a specific example of a "second transfer mode" of the present disclosure.

As illustrated in FIG. 1, the processor 100 includes the receiver 100*a* and the master 100*b*. The processor 100 corresponds to a specific example of a "reception device" of the present disclosure. The master 100*b* corresponds to a specific example of each of a "transfer mode control section" and a "data reception section" of the present disclosure. As illustrated in FIG. 1, the image sensor 200 includes the transmitter 200*a* and the slave 200*b*. The image sensor 200 corresponds to a specific example of a "transmission device" of the present disclosure. The transmitter 200*a* corresponds to a specific example of a "second communication unit" of the present disclosure. The slave 200*b* corresponds to a specific example of each of a "transfer mode switching section" and a "data transmission section" of the present disclosure.

The clock line SCL and the data line SDA are used to transmit a signal between the master 100*b* and the slave 200*b*. For example, serial data is sequentially transmitted bit by bit via the data line SDA, and a serial clock of a predetermined frequency is transmitted via the clock line SCL. In the control data bus 700, the master 100*b* is able to transmit data all at once to all of the slaves 200*b*, 300, 400, and 500, or individually transmit data by specifying each of the slaves 200*b*, 300, 400, and 500 by an address. In addition, in the control data bus 700, the slave 200*b* is able to transmit data all at once to all of the master 100*b* and the slaves 300, 400, and 500, or individually transmit data by specifying each of the master 100*b* and the slaves 300, 400, and 500 by an address.

In addition, as described above, the master 100*b* and the slave 200*b* are each able to transmit and receive data by switching transmission methods between the SDR mode and the HDR mode.

(IBI-SDR)

Suppose that the transmission method is set to the SDR mode at the start of communication. At this time, for example, in the SDR mode, the slave 200*b* utilizes an IBI (In-Band Interrupt; interrupt) function of the I3C to transmit data to the master 100*b*. In the following, such data transmission is referred to as data transmission by IBI-SDR. The slave 200*b* issues an IBI request in a data format as illustrated in FIG. 2, for example, and outputs the data to the master 100*b* without a read command from the master 100*b*.

FIG. 2 illustrates an example of a data format of the IBI issued from the slave 200b in the SDR mode.

First, in the SDR mode, the slave 200b outputs a start condition (S) to the master 100b and the slaves 300, 400, and 500 via the control data bus 700, and declares the start of communication. For example, in a standby state where no communication is performed in the control data bus 700, both the clock line SCL and the data line SDA are set to a level H, and the slave 200b changes the data line SDA from the level H to a level L in a state where the clock line SCL is at the level H to thereby output the start condition (S). It is to be noted that the slave 200b may output the start condition (S) when detecting occurrence of an event. The slave 200b may regard, for example, acquisition of image data 210A described later as the occurrence of an event. For example, in a case where a human face is detected in the image data 210A described later, or in a case where a motion of a predetermined target included in each image data 210A is detected on the basis of multiple pieces of image data 210A described later, the slave 200b may regard such detection as the occurrence of an event. For example, in a case where the slave 200b includes a timer (internal counter) that controls an imaging timing of an imaging unit 210 described later, the slave 200b may regard acquisition of the image data 210A based on an output of the timer (internal counter) as the occurrence of an event. For example, in a case where a predetermined sensor is included, the slave 200b may regard a signal output from the predetermined sensor as the occurrence of an event.

After the output of the start condition (S), the slave 200b transmits the IBI request (DA/R) using the function of the I3C all at once to all of the master 100b and the slaves 300, 400, and 500 for the head of a frame. Subsequently, the slave 200b confirms successful reception using ACK (Acknowledge)/NACK. For example, the master 100b returns the ACK or NACK in response to a reception result of the IBI request (DA/R). Accordingly, the slave 200b confirms that the reception of the IBI request was successful by the return of the ACK from the master 100b. Thereafter, the slave 200b starts transmission of header data, and transmits, for example, MDB (Mandatory Data Byte) (HD0) or option data (HD1). The MDB (HD0) and the option data (HD1) each correspond to a specific example of the header data. The slave 200b further starts data transmission in the SDR mode, and transmits SDR data (DT1, . . . , Dtn) or the like.

At this time, the SDR data is, for example, RAW data (image data) obtained at an imaging element (e.g., the imaging unit 210 described later) or payload data (Payload Data) obtained by data processing in a LINK layer. The Payload data includes, for example, one line of pixel data in the image data obtained at the imaging element. The option data (HD1) may include, for example, Data Type, Data Byte, or the like of data included in the SDR data. The slave 200b transmits a command (Te) instructing to end the IBI-SDR when ending the data transmission by the IBI-SDR.

FIG. 3 illustrates an example of definition of the header data in the data transmission by the IBI-SDR. In the MDB (HD0), [7] is Reserved by an I3C standard specification, [6:2] is also Reserved, and [1:0] specifies a type of transfer data. The option data (HD1) [7:0] specifies numbers for transfer data bytes.

(IBI-DDR (1))

Next, description is given of an example of a case of switching the transmission method from the SDR mode to the HDR mode for data transmission. The slave 200b transmits data to the master 100b in HDR-DDR Write subsequent to the IBI in the SDR mode, for example. Hereinafter, such data transmission is referred to as data transmission by the IBI-DDR not using a read command. For example, the slave 200b outputs data to the master 100b in a data format as illustrated in FIG. 4 without using the read command from the master 100b.

FIG. 4 illustrates an example of a data format upon data transmission to the master 100b in the HDR-DDR Write subsequent to the IBI in the SDR mode.

First, the slave 200b outputs the start condition (S) to the master 100b and the slaves 300, 400, and 500 via the control data bus 700 in the SDR mode, and declares the start of communication. For example, in a standby state where no communication is performed in the control data bus 700, both the clock line SCL and the data line SDA are set to the level H, and the slave 200b changes the data line SDA from the level H to the level L in a state where the clock line SCL is at the level H to thereby output the start condition (S). It is to be noted that the slave 200b may output the start condition (S) when detecting the above-described occurrence of an event.

After the output of the start condition (S), the slave 200b transmits the IBI request utilizing the function of the I3C all at once to all of the master 100b and the slaves 300, 400, and 500 for the head of a frame. Subsequently, the slave 200b confirms successful reception using the ACK. For example, when reception of the IBI request is completed, the master 100b returns the ACK (e.g., 1-bit zero) as a notification of the completion of the reception. Accordingly, the slave 200b confirms that the reception of the IBI request was successful by the return of the ACK from the master 100b. Thereafter, the slave 200b starts transmission of header data, and transmits, for example, the MDB (HD0) or the option data (HD1). The MDB (HD0) and the option data (HD1) each correspond to a specific example of the header data. The option data (HD1) may include, for example, Data Type or Data Byte of data included in the HDR data. The slave 200b transmits the header data during a period between the IBI request and transmission of a switching command described later. The MDB (HD0) includes an identification bit to identify the type of data to be transmitted in the HDR mode, as described below. It is to be noted that the option data (HD1) may be omitted. In this case, the slave 200b may utilize, for example, the option data (HD1) at a position of a portion [14:8] of an HDR command (HDR WCMD) described later or the first word of HDR data (HDR WDt) described later.

Thereafter, the master 100b outputs a restart condition (Sr) to the slave 200b and the slaves 300, 400, and 500 via the control data bus 700, and declares the restart of the communication. When receiving the restart condition (Sr) from the master 100b, the slave 200b transmits a broadcast command (I3C Reserved byte (7E/W)) notifying of transmission of a command to all of the master 100b and the slaves 300, 400, and 500 all at once, and then transmits the ACK. Thereafter, the slave 200b transmits, to the master 100b and the slaves 300, 400, and 500, a switching command (CCC (ENTHDR)) instructing to switch the transmission method to the HDR mode, and transmits a 1-bit parity (T). The switching command (CCC (ENTHDR)) at this time corresponds to a write command in the HDR-DDR from the slave 200b to the master 100b. The above-described 1-bit parity (T) is used in the master 100b to detect an error in the CCC (ENTHDR).

The slave 200b transmits the above-described switching command (CCC (ENTHDR)) to the master 100b to thereby switch the transfer mode of the control data bus 700 from the SDR mode to the HDR mode. After the transmission method is switched to the HDR mode, the slave 200*b* starts data transmission in the HDR mode, and sequentially transmits the HDR command (HDR WCMD), the HDR data (HDR WDt), and an HDR CRC (Cyclic Redundancy Check) word. At this time, the HDR data (HDR WDt) is, for example, RAW data (image data) obtained by the imaging element (e.g., the imaging unit 210 described later) or payload data obtained by data processing in the LINK layer (e.g., an mipi LINK data processing unit 230 described later). The payload data includes, for example, one line of pixel data in the image data obtained by the imaging element. The CRC word is error-correcting data to perform a cyclic redundancy check. The master 100*b* is able to detect the end of a DDR sequence by monitoring Preamble of this CRC word, for example.

It is to be noted that, in a case where the number of serial clocks to be supplied onto the clock line SCL, which is necessary for transmission of the HDR data, is included in the header data, the master 100*b* is able to detect the end of the DDR sequence by detecting the number of serial clocks included in the header data. When detecting the end of the DDR sequence, the master 100*b* transmits an end command (Exit) instructing to end the IBI-DDR not using the read command. The slave 200*b* receives the end command (Exit) to thereby end the HDR mode, and returns the transfer mode of the control data bus 700 from the HDR mode to the SDR mode.

(IBI-DDR (2))

Next, description is given of another example of the case of switching the transmission method from the SDR mode to the HDR mode for data transmission. Subsequent to the IBI in the SDR mode, for example, the slave 200*b* transmits data to the master 100*b* in HDR-DDR Read. Hereinafter, such data transmission is referred to as data transmission by the IBI-DDR using a read command. The slave 200*b* outputs data to the master 100*b* using a read command from the master 100*b*, for example, in a data format illustrated in FIG. 5.

FIG. 5 illustrates an example of a data format upon data transmission to the master 100*b* in the HDR-DDR Read, subsequent to the IBI in the SDR mode.

First, the slave 200*b* outputs the start condition (S) to the master 100*b* and the slaves 300, 400, and 500 via the control data bus 700 in the SDR mode, and declares the start of communication. For example, in a standby state where no communication is performed in the control data bus 700, both the clock line SCL and the data line SDA are set to the level H, and the slave 200*b* changes the data line SDA from the level H to the level L in a state where the clock line SCL is at the level H to thereby output the start condition (S). It is to be noted that the slave 200*b* may output the start condition (S) when detecting the above-described occurrence of an event.

After the output of the start condition (S), the slave 200*b* transmits the IBI request utilizing the function of the I3C all at once to all of the master 100*b* and the slaves 300, 400, and 500 for the head of a frame. Subsequently, the slave 200*b* confirms successful reception using the ACK. For example, when reception of the IBI request is completed, the master 100*b* returns the ACK (e.g., 1-bit zero) as a notification of the completion of the reception. Accordingly, the slave 200*b* confirms that the reception of the IBI request was successful by the return of the ACK from the master 100*b*. Thereafter, the slave 200*b* starts transmission of header data, and transmits, for example, the MDB (HD0) or the option data (HD1). The MDB (HD0) and the option data (HD1) each correspond to a specific example of the header data. The slave 200*b* transmits the header data during a period between the IBI request and transmission of a switching command described later. The MDB (HD0) includes an identification bit to identify the type of data to be transmitted in the HDR mode, as described below. It is to be noted that the option data (HD1) may be omitted. In this case, the slave 200*b* may utilize, for example, the option data (HD1) at a position of a portion [14:8] of the HDR command (HDR WCMD) described later or the first word of the HDR data (HDR WDt) described later.

Thereafter, the master 100*b* outputs the restart condition (Sr) to the slave 200*b* and the slaves 300, 400, and 500 via the control data bus 700, and declares the restart of the communication. The master 100*b* further transmits the broadcast command (I3C Reserved byte (7E/W)) notifying of transmission of a command to all of the slaves 200*b*, 300, 400, and 500 all at once, and then transmits the ACK. Thereafter, the master 100*b* transmits, to the master 100*b* and the slaves 300, 400, and 500, the switching command (CCC (ENTHDR)) instructing to switch the transmission method to the HDR mode, and transmits a 1-bit parity (T). The switching command (CCC (ENTHDR)) at this time corresponds to a read command in the HDR-DDR from the master 100*b* to the slave 200*b*. The above-described 1-bit parity (T) is used in the slave 200*b* to detect an error in the CCC (ENTHDR).

The slave 200*b* receives the above-described switching command (CCC (ENTHDR)) from the master 100*b* to thereby switch the transfer mode of the control data bus 700 from the SDR mode to the HDR mode. After the transmission method is switched to the HRD mode, the slave 200*b* starts data transmission in the HDR mode, and sequentially transmits the HDR command (HDR WCMD), the HDR data (HDR WDt), and the HDR CRC word. At this time, the HDR data (HDR WDt) is, for example, RAW data obtained by the imaging element or payload data obtained by data processing in the LINK layer. The CRC word is error-correcting data to perform a cyclic redundancy check. The master 100*b* is able to detect the end of a DDR sequence by monitoring Preamble of this CRC word, for example. It is to be noted that, in a case where the number of serial clocks to be supplied onto the clock line SCL, which is necessary for transmission of the HDR data, is included in the header data, the master 100*b* is able to detect the end of the DDR sequence by detecting the number of serial clocks included in the header data. When detecting the end of the DDR sequence, the master 100*b* transmits an end command (Exit) instructing to end the IBI-DDR. When the slave 200*b* receives the end command (Exit) to thereby end the HDR mode, and returns the transfer mode of the control data bus 700 from the HDR mode to the SDR mode.

FIG. 6 illustrates an example of a data format of the MDB. FIGS. 7, 8, and 9 illustrate examples of Value Ranges of the MDB. FIG. 8 illustrates a specific example of a region A in FIG. 7, and FIG. 9 illustrates a specific example of each of regions B, C, and D in FIG. 7.

As illustrated in FIG. 6, the MDB is configured by eight bits (MDB [7] to MDB [0]). In a case where Interrupt Group Identifier (MDB [7:5]) is 3'b000 in Value Ranges of the MDB as illustrated in FIG. 8, the type of data described in the MDB [3:0] is switched by the value of MDB [4] included in Specific Interrupt Identifier Value (MDB [4:0]). For example, when the value of the MDB [4] is 1'b0 as illustrated in FIG. 8, the type of transfer data described in MDB [3:0] is RAW data. When the value of the MDB [4] is 1'b1, the type of transfer data described in the MDB [3:0] is mipi CSI-2 data or mipi CSI-3 data. The MDB [4] and the MDB

[3:0] each correspond to an identification bit to identify the type of data to be transmitted in the HDR mode.

In a case where the Interrupt Group Identifier (MDB [7:5]) is 3'b010, 3'b110, or 3'b111 in the Value Ranges of the MDB as illustrated in FIG. 9, the type of the data described in the MDB [3:0] may be switched by the value of the MDB [4] included in Specific Interrupt Identifier Value (MDB [4:0]). For example, when the value of the MDB [4] is 1'b0 as illustrated in FIG. 9, the type of the transfer data described in the MDB [3:0] is RAW data. When the value of the MDB [4] is 1'b1, the type of the transfer data described in the MDB [3:0] is the mipi CSI-2 data or the mipi CSI-3 data. The MDB [4] and the MDB [3:0] each correspond to an identification bit to identify the type of data to be transmitted in the HDR mode.

Incidentally, in the Value Ranges of the MDB, the value of MDB [6] included in the Interrupt Group Identifier (MDB [7:5]) is 1'b0 in FIG. 8 and 1'b1 in FIG. 9. The above may be utilized to cause the type of the data described in the MDB [3:0] to be switched by the value of the MDB [6], for example. At this time, the MDB [6] corresponds to an identification bit to identify the type of data to be transmitted in the HDR mode.

Next, description is given of a schematic configuration of the image sensor 200. FIG. 10 illustrates a schematic configuration example of the image sensor 200. The image sensor 200 includes, for example, the imaging unit 210 and a path selection unit 220 as illustrated in FIG. 10. The path selection unit 220 corresponds to a specific example of a "selection unit" of the present disclosure.

The imaging unit 210 converts an optical image signal obtained, for example, through an optical lens or the like into image data. For example, the imaging unit 210 includes, for example, a CCD (Charge Coupled Device) image sensor or a CMOS (Complementary Metal Oxide Semiconductor) image sensor. The imaging unit 210 includes an analog-to-digital conversion circuit, and converts analog image data into digital image data. The imaging unit 210 acquires the image data 210A by imaging, and outputs the acquired image data 210A to the path selection unit 220. The image data 210A is, for example, low-resolution image data or high-resolution image data. Example of the low-resolution image data include raw data.

The path selection unit 220 determines resolution and the like of the image data 210A obtained by the imaging unit 210, and selects a path through which the image data 210A is transmitted depending on a determination result. In a case where the image data 210A has low resolution, the path selection unit 220 sends, as image data 220A, the image data 210A to a handling data selection unit 240 and the mipi LINK data processing unit 230. In a case where the image data 210A has high resolution, the path selection unit 220 sends, as image data 220B, the image data 210A to the mipi LINK data processing unit 230.

The image sensor 200 further includes, for example, the mipi LINK data processing unit 230, the handling data selection unit 240, an output method selection unit 250, I3C PHY layers 260 and 270, and a mipi PHY layer 280, as illustrated in FIG. 10. The mipi LINK data processing unit 230 and the mipi PHY layer 280 are each an example of the configuration included in the transmitter 200a in FIG. 1. The handling data selection unit 240, the output method selection unit 250, and the I3C PHY layers 260 and 270 are each an example of the configuration included in the slave 200b in FIG. 1. The transmitter 200a is configured by, for example, one or two or more processors, various processing circuits, or the like, which is configured by an arithmetic circuit such as MPU (Micro Processing Unit). The slave 200b is configured by, for example, one or two or more processors, various processing circuit, or the like, which is configured by an arithmetic circuit such as MPU.

The mipi LINK data processing unit 230 is a circuit that generates and sends image data 230A corresponding to a transmission method of a mipi CSI-2 standard or a mipi CSI-3 standard on the basis of low-resolution image data 220A (e.g., RAW data) inputted from the path selection unit 220. Further, the mipi LINK data processing unit 230 is a circuit that generates and sends image data 230B corresponding to a transmission method of the mipi CSI-2 standard or the mipi CSI-3 standard on the basis of high-resolution image data 220B inputted from the path selection unit 220.

The handling data selection unit 240 issues the IBI in response to the IBI request to select and send image data corresponding to the type of the data described in the MDB [3:0]. For example, in a case where the type of the data described in the MDB [3:0] is data for transferring RAW data, the handling data selection unit 240 selects and sends the image data 220A. For example, in a case where the type of the data described in the MDB [3:0] is data for transferring the mipi CSI-2 data or the mipi CSI-3 data, the handling data selection unit 240 selects and sends the image data 230A.

The output method selection unit 250 selects data to be sent on the basis of data described in the MDB [4]. For example, in a case where the data described in the MDB [4] is 1'b0, the output method selection unit 250 selects and sends the image data 220A. At this time, it follows that the output method selection unit 250 selects the slave 200b but does not select the transmitter 200a in data transmission. For example, in a case where the data described in the MDB [4] is 1'b1, the output method selection unit 250 selects and sends the image data 230A. At this time, it follows that the output method selection unit 250 selects both of the transmitter 200a and the slave 200b in data transmission.

The I3C PHY layer 260 sends the image data 220A received from the output method selection unit 250 to the control data bus 700 in accordance with an I3C protocol. In a case where the transfer mode in the control data bus 700 is the SDR mode, the I3C PHY layer 260 places the image data 220A on the SDR data (DT1, . . . , Dtn) to send it to the control data bus 700. In a case where the transfer mode in the control data bus 700 is the HDR mode, the I3C PHY layer 260 places the image data 220A on the HDR data (HDR WDt) to send it to the control data bus 700. At this time, the I3C PHY layer 260 is able to place the image data 220A on the HDR data (HDR WDt) to send it to the control data bus 700 without using a read command from the master 100b. The I3C PHY layer 260 is also able to place the image data 220A on the HDR data (HDR WDt) to send it to the control data bus 700 depending on an input of a read command from the master 100b.

The I3C PHY layer 270 sends the image data 230A received from the output method selection unit 250 to the control data bus 700 in accordance with the I3C protocol. In a case where the transfer mode in the control data bus 700 is the SDR mode, the I3C PHY layer 270 places the image data 230A on the SDR data (DT1, . . . , Dtn) to send it to the control data bus 700. In a case where the transfer mode in the control data bus 700 is the HDR mode, the I3C PHY layer 270 places the image data 230A on the HDR data (HDR WDt) to send it to the control data bus 700. At this time, the I3C PHY layer 270 is able to place the image data 230A on the HDR data (HDR WDt) to send it to the control data bus 700 depending on an input of a read command from the master 100b.

The mipi PHY layer 280 sends the image data 230B inputted from the mipi LINK data processing unit 230 to the image data bus 600 in the mipi CSI-2 or the mipi CSI-3.

The image sensor 200 includes a power supply control unit 290 that controls power supply to the mipi LINK data processing unit 230 and the mipi PHY layer 280 on the basis of the data described in the MDB [4], for example, as illustrated in FIG. 10.

For example, in a case where the data described in the MDB [4] is 1'b0, the power supply control unit 290 turns OFF power supply to the mipi LINK data processing unit 230 and the mipi PHY layer 280. For example, in a case where data to be sent to the master 100b is the image data 220A (e.g., RAW data) (i.e., in a case where the slave 200b is selected in data transmission), the power supply control unit 290 turns OFF the power supply to the mipi LINK data processing unit 230 and the mipi PHY layer 280. For example, in a case where the data described in the MDB [4] is 1'b1, the power supply control unit 290 turns ON the power supply to the mipi LINK data processing unit 230 and the mipi PHY layer 280. For example, in a case where the data to be sent to the master 100b is the image data 230A or in a case where the image data 210A has high resolution (i.e., at least the transmitter 200a is selected from among the transmitter 200a and the slave 200b in data transmission), the power supply control unit 290 turns ON the power supply to the mipi LINK data processing unit 230 and the mipi PHY layer 280.

The power supply control unit 290 may control the power supply to the mipi LINK data processing unit 230 and the mipi PHY layer 280 depending on, for example, a determination result in the path selection unit 220 (e.g., resolution of the image data 210A) or on a selection result in the path selection unit 220 (e.g., a path through which the image data 210A is transmitted). For example, in a case where the image data 210A is determined to have high resolution in the path selection unit 220, the power supply control unit 290 turns ON the power supply to the mipi LINK data processing unit 230 and the mipi PHY layer 280.

The power supply control unit 29 may turn OFF only the power supply to the mipi PHY layer 280, instead of turning OFF the power supply to the mipi LINK data processing unit 230 and the mipi PHY layer 280. In addition, instead of turning OFF the power supply to the mipi LINK data processing unit 230 and the mipi PHY layer 280, the power supply control unit 29 may execute the following operations. The power supply control unit 29 may, for example, turn OFF the power supply to a PLL circuit included in the slave 200b; reduce a frequency of the PLL circuit included in the slave 200b; or reduce a power source voltage to be supplied to the mipi LINK data processing unit 230 and the mipi PHY layer 280.

[Operation]

Next, description is given of an operation of the communication system 1000 according to the present embodiment.

FIG. 11 illustrates an example of a data transmission procedure in the communication system 1000. First, the imaging unit 210 acquires the image data 210A by imaging (step S101). The path selection unit 220 determines whether or not the image data 210A has low resolution (step S102). As a result, in a case where determination is made that the image data 210A does not have low resolution (step S102; N), the path selection unit 220 outputs, as the image data 220B, the image data 210A to the mipi LINK data processing unit 230. On the basis of the image data 220B inputted from the path selection unit 220, the mipi LINK data processing unit 230 generates the image data 230B corresponding to the transmission method of the mipi CSI-2 standard or the mipi CSI-3 standard, and sends the generated image data 230B to the mipi PHY layer 280 (step S103). The mipi PHY layer 280 sends the image data 230B inputted from the mipi LINK data processing unit 230 to the image data bus 600 in the mipi CSI-2 or the mipi CSI-3 (step S104).

In a case where determination is made in step S102 that the image data 210A has low resolution (step S102; Y), the path selection unit 220 determines whether or not the image data 210A is RAW data (step S105). As a result, in a case where determination is made that the image data 210A is not RAW data (step S105; N), the path selection unit 220 outputs, as the image data 220A, the image data 210A to the mipi LINK data processing unit 230. On the basis of the image data 220A inputted from the path selection unit 220, the mipi LINK data processing unit 230 generates the image data 230A corresponding to the transmission method of the mipi CSI-2 standard or the mipi CSI-3 standard, and sends the generated image data 230A to the handling data selection unit 240 (step S103). The mipi PHY layer 280 sends the image data 230A inputted from the mipi LINK data processing unit 230 to the image data bus 600 in the mipi CSI-2 standard or the mipi CSI-3 standard (step S104).

In a case where determination is made in step S105 that the image data 210A is RAW data (step S105; Y), or in a case where the data processing at the mipi LINK data processing unit 23 is completed, the slave 200b issues the IBI request (step S106). Then, the handling data selection unit 240 invokes the IBI in response to the IBI request to select and send image data corresponding to the type of the data described in the MDB [3:0] (step S107). For example, in a case where the type of the data described in the MDB [3:0] is data for transferring RAW data, the handling data selection unit 240 selects and sends the image data 220A. For example, in a case where the type of the data described in the MDB [3:0] is data for transferring the mipi CSI-2 or the mipi CSI-3 data, the handling data selection unit 240 selects and sends the image data 230A.

The output method selection unit 250 selects data to be sent on the basis of the data described in the MDB [4] (step S108). For example, in a case where the data described in the MDB [4] is 1'b0, the output method selection unit 250 selects and sends the image data 220A. For example, in a case where the data described in the MDB [4] is 1'b1, the output method selection unit 250 selects and sends the image data 230A. It is to be noted that the output method selection unit 250 may select data to be sent on the basis of data described in the MDB [6] or pieces of data described in the MDB [4] and the MDB [6].

In a case where the data described in the MDB [4] is 1'b0 (step S109; Y), the I3C PHY layer 260 places the image data 220A inputted from the output method selection unit 250 on payload data to send it to the control data bus 700 in accordance with the I3C protocol without a read command from the master 100b (step S110). In a case where the data described in the MDB [4] is 1'b1 (step S109; N), upon acquisition of a read command from the master 100b (step S111), the I3C PHY layer 270 sends the image data 230A inputted from the output method selection unit 250 to the control data bus 700 in accordance with the I3C protocol (step S112).

In a case of acquiring image data from the slave 200b via the control data bus 700 through step S110 or step S112, the master 100*b* may process the acquired image data to thereby make predetermined determination. For example, in a case where determination is made that the resolution of the acquired image data is insufficient, the master 100*b* may send a control signal instructing to perform high-resolution imaging to the slave 200*b* via the control data bus 700.

It is to be noted that, as illustrated in FIG. 12, in a case where the data described in the MDB [4] is 1'b0 (step S109; Y), upon acquisition of a read command from the master 100*b* (step S113), the I3C PHY layer 260 may send the image data 220A inputted from the output method selection unit 250 to the control data bus 700 in accordance with the I3C protocol (step S114).

[Effects]

Next, description is given of effects of the communication system 1000 according to the present embodiment.

In the present embodiment, the transfer mode of the control data bus 700 is switched from the SDR mode to the HDR mode by transmitting the switching command (CCC (ENTHDR)) of the transfer mode after issuance of the IBI request using the function of the I3C. This eliminates the need to provide a dedicated terminal for the IBI request and eliminates the need to receive the switching command (CCC (ENTHDR)) from the master 100*b*. As a result, it is possible to achieve higher speed and lower power consumption in the data transmission.

In the present embodiment, the transfer mode of the control data bus 700 is switched from the SDR mode to the HDR mode by receiving the switching command (CCC (ENTHDR)) of the transfer mode from the master 100*b* after issuance of the IBI request using the function of the I3C. This eliminates the need to provide a dedicated terminal for the IBI request. As a result, it is possible to achieve higher speed and lower power consumption in the data transmission.

In addition, in the present embodiment, the end command (Exit) instructing to end the HDR mode is received from the master 100*b*, thereby causing the HDR mode to be ended and the transfer mode of the control data bus 700 to be returned to the SDR mode. This eliminates the need to provide a dedicated terminal for mode switching. As a result, it is possible to achieve higher speed and lower power consumption in the data transmission.

In addition, in the present embodiment, during a period between the IBI request and the transmission of the switching command (CCC (ENTHDR)), the header data (MDB (HD0)) including an identification bit to identify the type of data to be transmitted in the HDR mode is transmitted, and data of a type corresponding to the identification bit is transmitted from the slave 200*b* to the master 100*b*. This makes it possible to suppress the load of the master 100*b* caused by the mode switching. As a result, it is possible to achieve higher speed and lower power consumption in the data transmission.

In addition, according to the present embodiment, selection is made between the transmitter 200*a* and the slave 200*b* to communicate depending on data to be transmitted. This makes it possible to turn OFF power supply to the transmitter 200*a* in a case where the slave 200*b* is selected. In such a case, it is possible to achieve lower power consumption in the data transmission.

2. MODIFICATION EXAMPLE

In the above-described embodiment, the mipi LINK data processing unit 230 may set one or multiple regions for the image data 210A outputted from the imaging unit 210. In this case, a region set for the image data 210A is referred to as ROI (Region Of Interest). Hereinafter, the region set for the image data 210A is referred to as "ROI". In addition, the image data of the region is referred to as "ROI image data".

Examples of processing to set the region for the image data 210A include any processing that makes it possible to identify a partial region in the image data 210A (or any processing that makes it possible to cut out a partial region from the image data 210A) such as "processing to detect an object from the image data 210A and to set a region including the detected object" or "processing to set a region specified by an operation or the like on any operating device".

The mipi LINK data processing unit 230 transmits ROI image data, i.e., transmits a portion of the image data 210A to thereby reduce a data amount of the transmission as compared with transmission of the entire image data 210A. Thus, the transmission of the ROI image data by the mipi PHY layer 280 achieves, for example, various effects obtained by the reduction in the data amount, such as reduction in transmission time and reduction in transmission load in the mipi PHY layer 280.

(Structure of Packet)

Next, description is given of an example of a structure of a packet to be utilized for transmission of an image from the mipi PHY layer 280 to the master 100*b*. The mipi PHY layer 280 divides image data into pieces of partial image data in a row unit, and transmits the partial image data for each row by utilizing one or more packets. The same holds true also for the ROI image data.

FIG. 13 illustrates an example of a structurer of a packet (Packet) to be utilized for transmission of image data in the mipi PHY layer 280. FIG. 13 illustrates an example of the structure of a packet to be utilized upon transmission of image data in the mipi CSI-2 standard or the mipi CSI-3 standard. FIG. 14 illustrates an example of transmission data 280A to be transmitted from the mipi PHY layer 280 to the master 100*b*. FIG. 14 illustrates an example of the transmission data 280A to be utilized upon transmission of image data in the mipi CSI-2 standard or the mipi CSI-3 standard.

The packet to be utilized for transmission of image data includes a packet header PH and payload data arranged in this order. The payload data includes pixel data of a partial image in a row unit. The packet header PH and the payload data correspond to each individual SDR data (DT1, . . . , Dtn) when performing data transmission in the SDR mode, for example. The packet header PH and the payload data correspond to each individual HDR data (HDR WDt) when performing data transmission in the DDR, for example.

The packet header PH is, for example, a packet header in Long Packet Payload Data. The Long Packet Payload Data refers to main data to be transmitted between the mipi PHY layer 280 and the master 100*b*. The packet header PH includes, for example, DI, WC, and ECC (Error-Correcting Code). The DI is a region storing data identifier. The DI includes VC (virtual channel) numbers and Data Type (data type of each ROI). The VC is a concept introduced for packet flow control, and is a mechanism to support multiple independent data streams sharing the same link. The WC is a region for indicating, to the master 100*b*, a packet end using the number of words. The WC includes, for example, Payload length. The Payload length is, for example, the number of bytes included in Long Packet Payload, e.g., the number of bytes for each ROI. The ECC is Payload Data ECC information including values for performing error detection or correction on the Payload Data. The ECC includes an error-correcting code.

The transmission data 280A is configured by, for example, an image data frame as illustrated in FIG. 14. The image data frame typically includes a header region R1 and a packet region R2. In the image data frame, the header region R1 includes, for example, the MDB (HD0) and the option data (HD1). In the image data frame, the header region R1 includes header information including Embedded Data and header ECC information for performing error detection or correction on the header information. The Embedded Data refers to additional information embeddable in the header of the image data frame. At this time, the Embedded Data includes a frame number, the number of ROIs, and ROI information. The header ECC information includes values for performing error detection or correction on the header information. The header ECC information includes an error-correcting code.

The frame number is an identifier of the transmission data 280A. The number of ROIs is the total number of ROIs included in the transmission data 280A. The ROI information is information about the ROI provided for each ROI included in the transmission data 280A.

The ROI information includes, for example, region numbers (or priority) of one or multiple ROIs included in image data and positional information on the one or the multiple pieces of ROIs in the image data. The region number of the ROI is an identifier assigned to each ROI. The priority of the ROI is an identifier assigned to each ROI, and is a discrimination information enabling one to discriminate which of the multiple pieces of ROIs in the image data has been subjected to omission of an overlapping region.

The positional information on the ROI includes, for example, top left edge coordinates (Xa, Ya) of the ROI, a length of the ROI in an X-axis direction, and a length of the ROI in a Y-axis direction. The length of the ROI in the X-axis direction is, for example, a physical region length XLa of the ROI in the X-axis direction. The length of the ROI in the Y-axis direction is, for example, a physical region length YLa of the ROI in the Y-axis direction. The physical region length refers to a physical length (data length) of the ROI. The positional information on the ROI may include coordinates of a position different from the top left edge of the ROI. The positional information on the ROI further includes, for example, an output region length XLc of the ROI in the X-axis direction and an output region length YLc of the ROI in the Y-axis direction. The output region length is, for example, a physical length (data length) of the ROI after having been subjected to a change in resolution by thinning processing, pixel addition, or the like made on the ROI.

The ROI information may further include, for each ROI, for example, sensing information, exposure information, gain information, an AD (Analog-Digital) word length, an image format, and the like, in addition to the positional information. The sensing information refers to the content of arithmetic operation for an object included in the ROI, auxiliary information for subsequent-stage signal processing on the ROI image data, and the like. The exposure information refers to exposure time of the ROI. The gain information refers to gain information on the ROI. The AD word length refers to a word length of data per pixel subjected to AD conversion within the ROI. The image format refers to a format of the ROI image data.

In addition, as illustrated in FIG. 14, in the data frame, the packet region R2 includes the Long Packet Payload Data for one line, and further includes the packet header PH at a head position of the Long Packet Payload Data.

In addition, the packet region R2 includes image data 281. The image data 281 included in the packet region R2 is configured by one image data or multiple pieces of ROI image data. Here, in FIG. 14, for example, certain ROI image data 281a is included in a packet group close to the packet header PH, and another ROI image data 281b is included in a packet group distant from the packet header PH. These two pieces of ROI image data 281a and 281b configure the image data 281. One line of pixel data in the image data 281 is included in the Long Packet Payload Data of each line.

FIG. 15 illustrates examples of the image data 210A obtained by the imaging unit 210. FIG. 15 illustrates examples of the image data 210A obtained by the imaging unit 210 at different imaging timings. As illustrated in FIG. 15, ROI image data a1, ROI image data b1, and ROI image data c1 are at positions that do not overlap one another. FIG. 16 illustrates an example of encoding of the image data 210A in FIG. 15. It is to be noted that FIG. 16 illustrates an example of the transmission data 280A when encoding is performed in accordance with a rule specified in SROI (Smart Region Of Interest) in the mipi CSI-2 standard or the mipi CSI-3 standard.

The transmission data 280A is configured by, for example, a data frame as illustrated in FIG. 16. The data frame typically includes the header region R1 and the packet region R2. In the data frame, the header region R1 includes the Embedded Data. The Embedded Data refers to additional information embeddable in the header or footer of the data frame. At this time, the Embedded Data includes auxiliary data ds as metadata (metaData).

In addition, as illustrated in FIG. 16, in the data frame, the packet region R2 includes the Long Packet Payload Data for one line. In addition, the packet region R2 includes image data 282. The Long Packet Payload Data for each line includes one line of image Data in the image data 282. FIG. 16 exemplifies a location corresponding to the ROI image data a1, a location corresponding to the ROI image data b1, and a location corresponding to the ROI image data c1 in the image data 282. Here, the ROI image data a1, the ROI image data b1, and the ROI image data c1 are at positions that do not overlap one another, and thus, in the image data 282, the location corresponding to the ROI image data a1, the location corresponding to the ROI image data b1, and the location corresponding to the ROI image data c1 do not overlap one another.

The auxiliary data dc includes, for example, pieces of auxiliary data ds1, ds2, and ds3. The auxiliary data ds1 includes, for example, a frame number, an ROI number, and an ROI position of the ROI image data a1. The auxiliary data ds2 includes, for example, a frame number, an ROI number, and an ROI position of the ROI image data b1. The auxiliary data ds3 includes, for example, a frame number, an ROI number, and an ROI position of the ROI image data c1.

Figure 17:
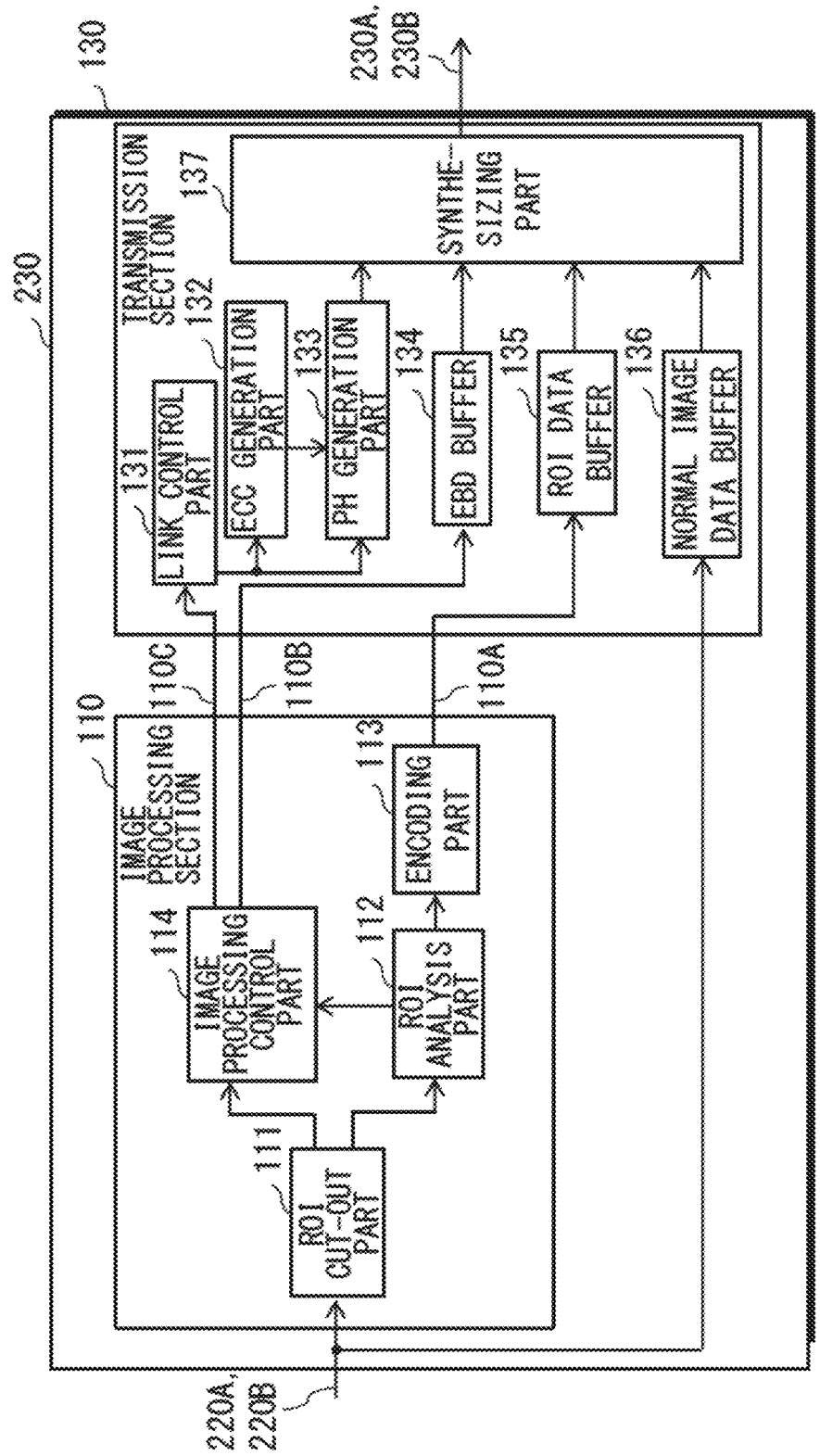
FIG. 17 illustrates a schematic configuration example of an mipi LINK data processing unit in FIG. 10.

FIG. 17 illustrates an example of a configuration of the mipi LINK data processing unit 230. The mipi LINK data processing unit 230 includes, for example, an image processing section 110 and a transmission section 130. The mipi LINK data processing unit 230 transmits, to the handling data selection unit 240 and the mipi PHY layer 280, the pieces of image data 230A and 230B generated by performing predetermined processing on the pieces of image data 220A and 220B.

The image processing section 110 is a circuit that performs predetermined processing on the pieces of image data 220A and 220B. In a case where a control signal instructing to cut out the ROI is inputted from the master 100b via the control data bus 700, the image processing section 110 performs the predetermined processing on the pieces of image data 220A and 220B. This allows the image processing section 110 to generate various types of data (110A, 110B, and 110C) and to outputs the various types of data to the transmission section 130.

The image processing section 110 includes, for example, an ROI cut-out part 111, an ROI analysis part 112, an encoding part 113, and an image processing control part 114.

The ROI cut-out part 111 specifies one or multiple objects to be captured included in the pieces of image data 220A and 220B, and sets an ROI for each specified object. The ROI cut-out part 111 cuts out one or multiple pieces of ROI image data (ROI image data) from the pieces of image data 220A and 220B. The ROI cut-out part 111 also assigns a region number as an identifier for each set ROI. For example, in a case where two ROIs are set in the pieces of image data 220A and 220B, the ROI cut-out part 111 assigns a region number 1 to one ROI, and assigns a region number 2 to another ROI. For example, the ROI cut-out part 111 stores the assigned identifier (region number) in a storage section. The ROI cut-out part 111 stores, in the storage section, for example, one or multiple pieces of ROI image data cut out from the pieces of image data 220A and 220B. The ROI cut-out part 111 further stores, in the storage section, for example, identifiers (region numbers) assigned to the one or the multiple pieces of ROIs in association with the one or the multiple pieces of ROI image data.

The ROI analysis part 112 derives ROI information 110B in the pieces of image data 220A and 220B for each ROI. For example, the ROI analysis part 112 stores the derived ROI information 110B in the storage section. The encoding part 113 encodes the one or the multiple pieces of ROI image data to generate image data 110A. The encoding refers to grouping multiple data units (e.g., multiple pieces of ROI image data) into one data unit.

The image processing control part 114 acquires the ROI information 110B from the ROI analysis part 112, and generates frame information 110C. The image processing control part 114 transmits the ROI information 110B and the frame information 110C to the transmission section 130. The frame information 120C includes, for example, a virtual channel number assigned to each frame, a data type of each ROI, a Payload length of each line, and the like. The data type includes, for example, YUV data, RGB data, RAW data, or the like. The data type further includes, for example, data in an ROI form or data in a normal form.

The transmission section 130 is a circuit that generates and sends the pieces of image data 230A and 230B on the basis of the inputted various types of data (110A, 110B, 110C, 220A, and 220B). The transmission section 130 sends, in the Embedded Data, the ROI information 110B on the one or the multiple pieces of ROIs in the pieces of image data 220A and 220B. Further, in a case where a control signal instructing to cut out the ROI is inputted from the master 100b via the control data bus 700, the transmission section 130 generates and sends the image data 230A corresponding to the transmission method of the mipi CSI-2 standard or the mipi CSI-3 standard on the basis of the image data 110A obtained from the image data 220A. In addition, on the basis of the image data 110A obtained from the image data 220B, the transmission section 130 generates and sends the image data 230B corresponding to the transmission method of the mipi CSI-2 standard or the mipi CSI-3 standard. At this time, the transmission section 130 sends the image data 110A by an image data frame, and sends the ROI information 110B about each ROI by a header of the image data frame. In addition, in a case where a control signal instructing to output a normal image is inputted from the master 100b via the control data bus 700, the transmission section 130 generates and sends the image data 230A corresponding to the transmission method of the mipi CSI-2 standard or the mipi CSI-3 standard on the basis of the image data 220A. In addition, on the basis of the image data 220B, the transmission section 130 generates and sends the image data 230B corresponding to the transmission method of the mipi CSI-2 standard or the mipi CSI-3 standard.

The transmission section 130 includes, for example, a LINK control part 131, an ECC generation part 132, a PH generation part 133, an EBD buffer 134, an ROI data buffer 135, a normal image data buffer 136, and a synthesizing part 137. In a case where a control signal instructing to cut out the ROI is inputted from the master 100b via the control data bus 700, the LINK control part 131, the ECC generation part 132, the PH generation part 133, the EBD buffer 134, and the ROI data buffer 135 makes an output to the synthesizing part 137. In a case where a control signal instructing to output a normal image is inputted from the master 100b via the control data bus 700, the normal image data buffer 136 makes an output to the synthesizing part 137. It is to be noted that the ROI data buffer 135 may also serve as the normal image data buffer 136.

The LINK control part 131 outputs, for example, the frame information 110C for each line to the ECC generation part 132 and the PH generation part 133. For example, on the basis of data (e.g., a virtual channel number, a data type of each ROI, a Payload length of each line, and the like) for one line in the frame information 110C, the ECC generation part 132 generates an error-correcting code for the line. The ECC generation part 132 outputs, for example, the generated error-correcting code to the PH generation part 133. The PH generation part 133 uses, for example, the frame information 110C and the error-correcting code generated by the ECC generation part 132 to generate the packet header PH for one line. At this time, the packet header PH is, for example, a packet header in the Long Packet Payload Data. The packet header PH includes, for example, the DI, the WC, and the ECC. The PH generation part 133 outputs the generated packet header PH to the synthesizing part 137.

The EBD buffer 134 temporarily stores the ROI information 110B, and outputs the ROI information 110B as the Embedded Data to the synthesizing part 137 at a predetermined timing. The Embedded Data refers to additional information embeddable in a header of the image data frame. The Embedded Data includes, for example, the ROI information 110B.

The ROI data buffer 135 temporarily stores the image data 110A, and outputs the image data 110A as the Long Packet Payload Data to the synthesizing part 137 at a predetermined timing. In a case where a control signal instructing to cut out the ROI is inputted from the master 100b via the control data bus 700, the ROI data buffer 135 outputs the image data 110A as the Long Packet Payload Data to the synthesizing part 137. The normal image data buffer 136 temporarily stores the pieces of image data 220A and 220B, and out-places the pieces of image data 220A and 220B as the Long Packet Payload Data to the synthesizing part 137 at a predetermined timing. In a case where a control signal instructing to output a normal image is inputted from the master 100b via the control data bus 700, the normal image data buffer 136 outputs the pieces of image data 220A and 220B as the Long Packet Payload Data to the synthesizing part 137.

In a case where a control signal instructing to output a normal images is inputted from the master 100*b* via the control data bus 700, the synthesizing part 137 generates the pieces of image data 230A and 230B on the basis of inputted data (pieces of image data 220A and 220B). The synthesizing part 137 outputs the generated pieces of image data 230A and 230B to the master 100*b* via the control data bus 700. Meanwhile, in a case where a control signal instructing to cut out the ROI is inputted from the master 100*b* via the control data bus 700, the synthesizing part 137 generates the pieces of image data 230A and 230B on the basis of inputted various types of data (packet header PH, ROI information 110B, and image data 110A). The synthesizing part 137 outputs the generated pieces of image data 230A and 230B to the master 100*b* via the control data bus 700. That is, the synthesizing part 137 sends Data Type (data type of each ROI) to be included in the packet header PH of the Long Packet Payload Data.

In the present modification example, the one or the multiple pieces of ROI image data cut out by the ROI cut-out part 111 are transmitted from the slave 200*b* to the master 100*b* via the control data bus 700 in the HDR mode. This makes it possible to suppress an amount of data to be transmitted and to further suppress the load of the master 100*b*. As a result, it is possible to achieve higher speed and lower power consumption in the data transmission.

Although the description has been given hereinabove of the present disclosure with reference to the embodiment and modification example thereof, the present disclosure is not limited to the foregoing embodiment, etc., and may be modified in a wide variety of ways. It is to be noted that the effects described herein are merely illustrative. The effects of the present disclosure are not limited to those described herein. The present disclosure may have other effects than those described herein.

According to the transmission device of a first aspect of the present disclosure and the communication system of the first aspect of the present disclosure, the transfer mode of the control data bus is switched from the first transfer mode to the second transfer mode by transmitting the switching command in the transfer mode after issuance of the IBI request using the function of the I3C. This eliminates the need to provide a dedicated terminal for the IBI request, and eliminates the need to receive the switching command from the reception device. As a result, it is possible to achieve higher speed and lower power consumption in the data transmission.

According to the transmission device of a second aspect of the present disclosure and the communication system of the second aspect of the present disclosure, the transfer mode of the control data bus is switched from the first transfer mode to the second transfer mode by receiving from the reception device the switching command in the transfer mode after issuance of the IBI request using the function of the I3C. This eliminates the need to provide a dedicated terminal for the IBI request. As a result, it is possible to achieve higher speed and lower power consumption in the data transmission.

In addition, for example, the present disclosure may have the following configurations.

(1)

A transmission device that communicates with a reception device via a control data bus in a communication standard of I3C (Improved Inter Integrated Circuit), the transmission device including:

a transfer mode switching section that switches a transfer mode of the control data bus from a first transfer mode to a second transfer mode having a faster transfer speed than the first transfer mode by transmitting a switching command instructing to switch to the second transfer mode after issuance of an IBI (In-Band Interrupt) request using a function of the I3C in the first transfer mode; and a data transmission section that transmits data to the reception device via the control data bus in the second transfer mode.

(2)

The transmission device according to (1), in which the transfer mode switching section ends the second transfer mode by receiving from the reception device an end command instructing to end the second transfer mode, and returns the transfer mode of the control data bus to the first transfer mode.

(3)

The transmission device according to (1) or (2), in which the transfer mode switching section transmits MDB (Mandatory Data Byte) including an identification bit to identify a type of data to be transmitted in the second transfer mode during a period between the IBI request and the transmission of the switching command, and the data transmission section transmits data of a type corresponding to the identification bit.

(4)

The transmission device according to any one of (1) to (3), in which the first transfer mode includes an SDR (Standard Data Rate) mode, and the second transfer mode includes an HDR (High Data Rate) mode.

(5)

The transmission device according to any one of (1) to (4), in which the transmission device and the reception device are also configured to communicate via an image data bus specified by MIPI, and the transmission device includes:

a first communication unit that includes the transfer mode switching section and the data transmission section, and communicates via the control data bus;

a second communication unit that communicates via the image data bus; and a selection unit that selects which of the first communication unit and the second communication unit to communicate depending on data to be transmitted.

(6)

The transmission device according to (5), further including a power supply control unit that controls power supply to the second communication unit in a case where the first communication unit is selected by the selection unit.

(7)

A transmission device that communicates with a reception device via a control data bus in a communication standard of I3C (Improved Inter Integrated Circuit), the transmission device including:

a transfer mode switching section that switches a transfer mode of the control data bus from a first transfer mode to a second transfer mode having a faster transfer speed than the first transfer mode by receiving from the reception device a switching command instructing to switch to the second transfer mode after issuance of an IBI (In-Band Interrupt) request using a function of the I3C in the first transfer mode; and a data transmission section that transmits data to the reception device via the control data bus in the second transfer mode.

(8)

The transmission device according to (7), in which the transfer mode switching section ends the second transfer mode by receiving from the reception device an end command instructing to end the second transfer mode, and returns the transfer mode of the control data bus to the first transfer mode.

(9)

The transmission device according to (7) or (8), in which
the transfer mode switching section transmits MDB (Mandatory Data Byte) including an identification bit to identify a type of data to be transmitted in the second transfer mode during a period between the IBI request and transmission of the switching command, and
the data transmission section transmits data of a type corresponding to the identification bit.

(10)

The transmission device according to any one of (7) to (9), in which
the first transfer mode includes an SDR (Standard Data Rate) mode, and
the second transfer mode includes an HDR (High Data Rate) mode.

(11)

The transmission device according to any one of (7) to (10), in which
the transmission device and the reception device are also configured to communicate via an image data bus specified by MIPI, and
the transmission device includes:
a first communication unit that includes the transfer mode switching section and the data transmission section, and communicates via the control data bus;
a second communication unit that communicates via the image data bus; and
a selection unit that selects which of the first communication unit and the second communication unit to communicate depending on data to be transmitted.

(12)

The transmission device according to (11), further including a power supply control unit that controls power supply to the second communication unit in a case where the first communication unit is selected by the selection unit.

(13)

A transmission system including:
a control data bus; and
a transmission device and a reception device that communicate via the control data bus in a communication standard of I3C (Improved Inter Integrated Circuit), in which
the transmission device includes
a transfer mode switching section that switches a transfer mode of the control data bus from a first transfer mode to a second transfer mode having a faster transfer speed than the first transfer mode by transmitting a switching command instructing to switch to the second transfer mode after issuance of an IBI (In-Band Interrupt) request using a function of the I3C in the first transfer mode, and
a data transmission section that transmits data to the reception device via the control data bus in the second transfer mode, and
the reception device includes
a transfer mode control section that receives the IBI request from the transmission device via the control data bus in the first transfer mode, and then receives the switching command from the transmission device, and
a data reception section that receives data from the transmission device via the control data bus in the second transfer mode.

(14)

A transmission system including:
a control data bus; and
a transmission device and a reception device that communicate via the control data bus in a communication standard of I3C (Improved Inter Integrated Circuit), in which
the transmission device includes
a transfer mode switching section that switches a transfer mode of the control data bus from a first transfer mode to a second transfer mode having a faster transfer speed than the first transfer mode by receiving from the reception device a switching command instructing to switch to the second transfer mode after issuance of an IBI (In-Band Interrupt) request using a function of the I3C in the first transfer mode, and
a data transmission section that transmits data to the reception device via the control data bus in the second transfer mode, and
the reception device includes
a transfer mode control section that receives the IBI request from the transmission device via the control data bus in the first transfer mode, and then transmits the switching command to the transmission device, and
a data reception section that receives data from the transmission device via the control data bus in the second transfer mode.

(15)

The transmission device according to any one of (1) to (6), further including:
an imaging unit that acquires image data by imaging; and
an ROI (Region Of Interest) cut-out part that cuts out one or multiple pieces of ROI image data from the image data acquired by the imaging unit, in which
the data transmission section transmits the one or the multiple pieces of ROI image data cut out by the ROI cut-out part to the reception device via the control data bus in the second transfer mode.

(16)

The transmission device according to any one of (7) to (12), further including:
an imaging unit that acquires image data by imaging; and
an ROI (Region Of Interest) cut-out part that cuts out one or multiple pieces of ROI image data from the image data acquired by the imaging unit, in which
the data transmission section transmits the one or the multiple pieces of ROI image data cut out by the ROI cut-out part to the reception device via the control data bus in the second transfer mode.

This application claims the benefit of Japanese Priority Patent Application JP2019-188009 filed with the Japan Patent Office on Oct. 11, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. A transmission device that communicates with a reception device via a control data bus in a communication standard of I3C (Improved Inter Integrated Circuit), the transmission device comprising:

a data transmission section configured to transmit different types of data to the reception device via the control data bus, the different types of data including low resolution raw data and MIPI CSI data; and a transfer mode switching section that switches a transfer mode of the control data bus from a first transfer mode to a second transfer mode that has a faster transfer speed than the first transfer mode by transmitting a switching command instructing to switch to the second transfer mode after issuance of an IBI (In-Band Interrupt) request using a function of the I3C in the first transfer mode, wherein the data transmission section is further configured to transmit one of the low resolution raw data or the MIPI CSI data to the reception device via the control data bus in the second transfer mode, and wherein the control data bus is a high-speed differential link.

2. The transmission device according to claim 1, wherein the transfer mode switching section ends the second transfer mode by receiving from the reception device an end command instructing to end the second transfer mode, and returns the transfer mode of the control data bus to the first transfer mode.

3. The transmission device according to claim 1, wherein the transfer mode switching section transmits MDB (Mandatory Data Byte) including an identification bit to identify a type of data to be transmitted in the second transfer mode during a period between the IBI request and the transmission of the switching command, and the data transmission section transmits data of a type corresponding to the identification bit.

4. The transmission device according to claim 1, wherein the first transfer mode comprises an SDR (Standard Data Rate) mode, and the second transfer mode comprises an HDR (High Data Rate) mode.

5. The transmission device according to claim 1, wherein the transmission device and the reception device are also configured to communicate via an image data bus specified by MIPI, and the transmission device comprises:
a first communication unit that includes the transfer mode switching section and the data transmission section, and communicates the one of the low resolution raw data or the MIPI CSI data via the control data bus;
a second communication unit that communicates MIPI image data via the image data bus; and
a selection unit that selects which of the first communication unit and the second communication unit to communicate depending on data to be transmitted,
wherein the MIPI image data is associated with the MIPI CSI data.

6. The transmission device according to claim 5, further comprising
a power supply control unit that controls power supply to the second communication unit in a case where the first communication unit is selected by the selection unit.

7. A transmission device that communicates with a reception device via a control data bus in a communication standard of I3C (Improved Inter Integrated Circuit), the transmission device comprising:
a data transmission section configured to transmit different types of data to the reception device via the control data bus, the different types of data including low resolution raw data and MIPI CSI data; and a transfer mode switching section that switches a transfer mode of the control data bus from a first transfer mode to a second transfer mode having a faster transfer speed than the first transfer mode by receiving from the reception device a switching command instructing to switch to the second transfer mode after issuance of an IBI (In-Band Interrupt) request using a function of the I3C in the first transfer mode, wherein the data transmission section is further configured to transmit one of the low resolution raw data or the MIPI CSI data to the reception device via the control data bus in the second transfer mode, and wherein the control data bus is a high-speed differential link.

8. The transmission device according to claim 7, wherein the transfer mode switching section ends the second transfer mode by receiving from the reception device an end command instructing to end the second transfer mode, and returns the transfer mode of the control data bus to the first transfer mode.

9. The transmission device according to claim 7, wherein the transfer mode switching section transmits MDB (Mandatory Data Byte) including an identification bit to identify a type of data to be transmitted in the second transfer mode during a period between the IBI request and transmission of the switching command, and the data transmission section transmits data of a type corresponding to the identification bit.

10. The transmission device according to claim 7, wherein the first transfer mode comprises an SDR (Standard Data Rate) mode, and the second transfer mode comprises an HDR (High Data Rate) mode.

11. The transmission device according to claim 7, wherein the transmission device and the reception device are also configured to communicate via an image data bus specified by MIPI, and the transmission device comprises:
a first communication unit that includes the transfer mode switching section and the data transmission section, and communicates the one of the low resolution raw data or the MIPI CSI data via the control data bus;
a second communication unit that communicates MIPI image data via the image data bus; and
a selection unit that selects which of the first communication unit and the second communication unit to communicate depending on data to be transmitted,
wherein the MIPI image data is associated with the MIPI CSI data.

12. The transmission device according to claim 11, further comprising
a power supply control unit that controls power supply to the second communication unit in a case where the first communication unit is selected by the selection unit.

13. A transmission system comprising:
a control data bus that is a high-speed differential link; and
a transmission device and a reception device that communicate via the control data bus in a communication standard of I3C (Improved Inter Integrated Circuit), wherein
the transmission device includes
a data transmission section configured to transmit different types of data to the reception device via the control data bus, the different types of data including low resolution raw data and MIPI CSI data; and
a transfer mode switching section that switches a transfer mode of the control data bus from a first transfer mode to a second transfer mode having a faster transfer speed than the first transfer mode by transmitting a switching command instructing to switch to the second transfer mode after issuance of an IBI (In-Band Interrupt) request using a function of the I3C in the first transfer mode, wherein the data transmission section is further configured to transmit one of the low resolution raw data or the MIPI CSI data to the reception device via the control data bus in the second transfer mode, and the reception device includes a transfer mode control section that receives the IBI request from the transmission device via the control data bus in the first transfer mode, and then receives the switching command from the transmission device, and a data reception section that receives the one of the low resolution raw data or the MIPI CSI data from the transmission device via the control data bus in the second transfer mode.

14. A transmission system comprising:

a control data bus that is a high-speed differential link; and a transmission device and a reception device that communicate via the control data bus in a communication standard of I3C (Improved Inter Integrated Circuit), wherein the transmission device includes a data transmission section configured to transmit different types of data to the reception device via the control data bus, the different types of data including low resolution raw data and MIPI CSI data; and a transfer mode switching section that switches a transfer mode of the control data bus from a first transfer mode to a second transfer mode having a faster transfer speed than the first transfer mode by receiving from the reception device a switching command instructing to switch to the second transfer mode after issuance of an IBI (In-Band Interrupt) request using a function of the I3C in the first transfer mode, wherein the data transmission section is further configured to transmit one of the low resolution raw data or the MIPI CSI data to the reception device via the control data bus in the second transfer mode, and the reception device includes a transfer mode control section that receives the IBI request from the transmission device via the control data bus in the first transfer mode, and then transmits the switching command to the transmission device, and a data reception section that receives the one of the low resolution raw data or the MIPI CSI data from the transmission device via the control data bus in the second transfer mode.

15. The transmission device according to claim 1, further comprising:

an imaging unit that acquires image data by imaging; and an ROI (Region Of Interest) cut-out part that cuts out one or multiple pieces of ROI image data from the image data acquired by the imaging unit, wherein the one or the multiple pieces of ROI image data is the low resolution raw data.

16. The transmission device according to claim 7, further comprising:

an imaging unit that acquires image data by imaging; and an ROI (Region Of Interest) cut-out part that cuts out one or multiple pieces of ROI image data from the image data acquired by the imaging unit, wherein the one or the multiple pieces of ROI image data is the low resolution raw data.

17. The transmission device according to claim 1, further comprising:

an imaging unit that acquires image data by imaging; and an ROI (Region Of Interest) cut-out part that cuts out one or multiple pieces of ROI image data from the image data acquired by the imaging unit, wherein the MIPI CSI data is based on the one or the multiple pieces of ROI image data.

18. The transmission device according to claim 7, further comprising:

an imaging unit that acquires image data by imaging; and an ROI (Region Of Interest) cut-out part that cuts out one or multiple pieces of ROI image data from the image data acquired by the imaging unit, wherein the MIPI CSI data is based on the one or the multiple pieces of ROI image data.

19. The transmission device according to claim 5, wherein the first communication unit communicates the one of the low resolution raw data or the MIPI CSI data and the second communication unit communicates the MIPI image data in parallel to each other.

20. The transmission device according to claim 11, wherein the first communication unit communicates the one of the low resolution raw data or the MIPI CSI data and the second communication unit communicates the MIPI image data in parallel to each other.

* * * * *